US011687537B2

(12) United States Patent
Graff et al.

(10) Patent No.: US 11,687,537 B2
(45) Date of Patent: Jun. 27, 2023

(54) DATA PROCESSING SYSTEM FOR AUTOMATIC PRESETTING OF CONTROLS IN AN EVALUATION OPERATOR INTERFACE

(71) Applicant: Open Text Corporation, Waterloo (CA)

(72) Inventors: Steven J. Graff, Grapevine, TX (US); Lorne E. Wood, McKinney, TX (US)

(73) Assignee: OPEN TEXT CORPORATION, Waterloo (CA)

( * ) Notice: Subject to any disclaimer, the term of this patent is extended or adjusted under 35 U.S.C. 154(b) by 623 days.

(21) Appl. No.: 15/984,125

(22) Filed: May 18, 2018

(65) Prior Publication Data

US 2019/0354598 A1 Nov. 21, 2019

(51) Int. Cl.
*G06F 16/2457* (2019.01)
*G06F 3/04847* (2022.01)
*G06F 16/23* (2019.01)
*G06F 40/186* (2020.01)

(52) U.S. Cl.
CPC .... *G06F 16/24578* (2019.01); *G06F 3/04847* (2013.01); *G06F 16/2379* (2019.01); *G06F 40/186* (2020.01)

(58) Field of Classification Search
CPC .............. G06F 16/24578; G06F 16/2379
See application file for complete search history.

(56) References Cited

U.S. PATENT DOCUMENTS

| | | |
|---|---|---|
| 6,038,544 A | 3/2000 | Machin et al. |
| 6,604,084 B1 | 8/2003 | Powers |
| 6,606,744 B1 | 8/2003 | Mikurak |
| 9,350,808 B2 | 5/2016 | Beck |
| 9,742,914 B2 | 8/2017 | Surdick |
| 10,496,705 B1 | 12/2019 | Irani |
| 10,970,641 B1 | 4/2021 | Flowers |
| 11,057,519 B1 | 7/2021 | Miller |
| 2002/0062342 A1 | 5/2002 | Sidles |

(Continued)

OTHER PUBLICATIONS

Office Action for U.S. Appl. No. 15/958,960, dated Oct. 28, 2020, 18 pgs.

(Continued)

*Primary Examiner* — Kannan Shanmugasundaram
(74) *Attorney, Agent, or Firm* — Sprinkle IP Law Group

(57) ABSTRACT

One embodiment comprises a data processing system for populating selections in an evaluation operator interface. The system may record voice sessions of phone calls, transcribe the voice sessions and store transactions including the voice sessions and transcripts. The system receives a request from a client computer for an evaluation to evaluate a transaction that was assigned an automated score according to the automated scoring template based on a transcript of the transaction having matched a lexicon. The system generates the evaluation. Generating the evaluation comprises setting an answer control for a question in the evaluation to a preselected answer based on a defined correspondence between the automated score and the preselected answer, the preselected answer selected from a defined set of acceptable answers to the question. The system may generate page code for the answer control that sets the answer control to the preselected answer.

16 Claims, 16 Drawing Sheets

(56) References Cited

U.S. PATENT DOCUMENTS

| | | |
|---|---|---|
| 2002/0111811 A1 | 8/2002 | Bares |
| 2002/0128898 A1 | 9/2002 | Smith |
| 2003/0105659 A1 | 6/2003 | Eisenstein |
| 2005/0198563 A1 | 9/2005 | Kristjansson |
| 2005/0257134 A1 | 11/2005 | Goodman |
| 2007/0233549 A1 | 10/2007 | Watson |
| 2008/0010351 A1 | 1/2008 | Wardhaugh |
| 2008/0120257 A1 | 5/2008 | Goyal |
| 2008/0189171 A1 | 8/2008 | Wasserblat |
| 2010/0161315 A1 | 6/2010 | Melamed |
| 2011/0055202 A1* | 3/2011 | Heimendinger ...... G06F 16/245 707/721 |
| 2011/0206198 A1 | 8/2011 | Freedman et al. |
| 2012/0084081 A1 | 4/2012 | Melamed |
| 2013/0108242 A1 | 5/2013 | Oliver |
| 2014/0046726 A1 | 2/2014 | Brandt |
| 2014/0122183 A1 | 5/2014 | Niu |
| 2014/0241519 A1* | 8/2014 | Watson ............. G06Q 10/0631 379/265.06 |
| 2014/0272914 A1 | 9/2014 | Baraniuk et al. |
| 2014/0288944 A1 | 9/2014 | Miller |
| 2015/0177964 A1 | 6/2015 | Spirer |
| 2015/0356578 A1 | 12/2015 | Li |
| 2016/0112565 A1* | 4/2016 | Surdick ............... H04M 3/5175 379/265.06 |
| 2016/0119477 A1 | 4/2016 | Sharpe |
| 2016/0180360 A1 | 6/2016 | Tietzen |
| 2016/0189037 A1 | 6/2016 | Pereg |
| 2016/0196522 A1 | 7/2016 | Niu |
| 2016/0277577 A1* | 9/2016 | Yentis ................. G06F 16/3326 |
| 2017/0140467 A1 | 5/2017 | Neag |
| 2017/0300499 A1 | 10/2017 | Lev-Tov |
| 2019/0325465 A1 | 10/2019 | Newman |
| 2019/0335038 A1 | 10/2019 | Alonso y Caloca |
| 2019/0362645 A1 | 11/2019 | Miller |
| 2021/0281683 A1 | 9/2021 | Miller |

OTHER PUBLICATIONS

OpenText™ Qfiniti User Guide, Version 16.3, Open Text Corporation, Waterloo, CA, Oct. 24, 2017, 634 pgs.

OpenText™, What's New in OpenText Qfiniti 16, Version 16.3, Open Text WFO Software, Addison, Texas, Oct. 25, 2017, 105 pgs.

Office Action issued for U.S. Appl. No. 16/785,298, dated Sep. 23, 2020, 12 pages.

Autonomy Qfiniti User Guide Version 3.5 SP2 Document Revision 3, Autonomy, Inc., San Francisco, CA, May 31, 2012, 590 pgs.

Notice of Allowance for U.S. Appl. No. 16/785,298, dated Feb. 5, 2021, 9 pgs.

Notice of Allowance for U.S. Appl. No. 16/785,298, dated May 11, 2021, 5 pgs.

Office Action for U.S. Appl. No. 15/958,960, dated May 24, 2021, 21 pgs.

Office Action for U.S. Appl. No. 15/990,279, dated Jan. 5, 2022, 26 pgs.

Office Action for U.S. Appl. No. 14/958,960, dated Oct. 4, 2021, 24 pgs.

Office Action for U.S. Appl. No. 17/329,405, dated Feb. 3, 2022, 13 pgs.

Office Action for U.S. Appl. No. 15/958,960, dated Apr. 1, 2022, 25 pgs.

Office Action for U.S. Appl. No. 15/990,279, dated Jun. 9, 2022, 38 pgs.

Notice of Allowance for U.S. Appl. No. 17/329,405, dated Jul. 8, 2022, 8 pgs.

Office Action for U.S. Appl. No. 15/990,279, dated Dec. 22, 2022, 26 pgs.

Office Action for U.S. Appl. No. 15/958,960, dated Dec. 23, 2022, 16 pgs.

Office Action for U.S. Appl. No. 15/958,960, dated Aug. 31, 2022, 25 pgs.

Notice of Allowance for U.S. Appl. No. 17/329,405, dated Nov. 2, 2022, 6 pgs.

\* cited by examiner

─710

☐ Publish

General Information    Name    [_____]—702

Answers    Question

Attributes

704

Scoring Tip

706

Save    Cancel

☐ Publish

General Information    Type    [Radio Buttons ▼]—752

Answers    Answer Template    [Select One ▼]—754    (Add) (Edit) (Delete)

Attributes

Autoscore Range

| Name | Score | AutoScore Low | AutoScore High |
|------|-------|---------------|----------------|

755

☒ Enable AutoScore—756

Template for Question Score    [Select One ▼]—758

Save    Cancel

750    FIG. 7B

General Information
☐ Publish
Weighted [ Yes ▼ ]
Answers

[ Attributes ]

☐ Enable Auto Answer — 772
Auto Answer [ Select One ▼ ] — 774
Target Answer [ Select One ▼ ]
776

Add an Answer Template
Name [_____] — 802
Description [_____]
804
Type [ Radio Buttons ▼ ] — 806
( Add ) ( Edit ) ( Remove )

| Name | Score | AutoScore Low | AutoScore High |
|------|-------|---------------|----------------|
|      |       |               |                |

( Save ) ( Cancel )

| Name | Question Score | AutoScore Low | AutoScore High |
|---|---|---|---|
| Yes | 10 | 90 | 100 |
| No | 0 | 0 | 10 |

| Name | Question Score | AutoScore Low | AutoScore High |
|---|---|---|---|
| Excellent | 25 | 81 | 100 |
| Exceeds Expectations | 20 | 61 | 80 |
| Meets Expectations | 10 | | |
| Needs Improvement | 5 | | |
| Poor | 0 | 0 | 20 |

| Standard Company Greeting Autoscore Template Report | | | | |
|---|---|---|---|---|
| Transaction Date | Eval Date | Evaluator | Autoscore Answer | Evaluator Answer | Autoscore Answer Changed |
| 3/1/18 | 4/20/18 | John Smith | Yes | Yes | No |
| 3/2/18 | 4/20/18 | Jane Jones | Yes | No | Yes |
| ... | ... | ... | ... | ... | ... |
| 3/3/18 | 4/21/18 | John Smith | Yes | Yes | No |
| 3/4/18 | 4/21/18 | John Smith | No | No | No |

Confidence Score = 75%

DATA PROCESSING SYSTEM FOR AUTOMATIC PRESETTING OF CONTROLS IN AN EVALUATION OPERATOR INTERFACE

TECHNICAL FIELD

This disclosure relates generally to automated evaluation tools, and more particularly to a system and method for automatically setting controls in an evaluation operator interface.

BACKGROUND

Large organizations often use call centers staffed by a number of call center agents to provide services to customers or other individuals calling the call center. A call center agent must respond to an incoming call courteously and efficiently to satisfy the calling customer's need and the goals of the organization implementing the call center. To promote effective handling of calls by agents, call centers typically include telecommunications equipment programmed to route incoming calls to call center agents having particular skills or expertise. While helping to ensure that calls are handled by agents with the proper skillsets, such mechanisms do not evaluate the interactions between the agents and customers.

An agent interacting with a customer represents the organization to that customer, and is responsible for a significant part of the customer experience. Thus, there is great importance in evaluating the agents' performance on a regular basis. Call centers may therefore employ computer-implemented evaluation tools to facilitate evaluating interactions between agents and customers. In a typical call center evaluation scenario, an evaluator listens to a randomly selected call of a specific agent and fills in an evaluation form via the user interface to attribute to the agent or to the call a quality score or other scores and indications. More particularly, when an evaluator selects a call to evaluate, the evaluator also selects an evaluation form to use. The evaluation tool presents an instance of the evaluation form to the evaluator (e.g., in a web browser-based interface). The evaluator listens to the transaction and answers the questions in the evaluation. When completed, the evaluator or supervisor usually reviews the evaluation with the call center agent.

However, traditional computer-implemented evaluation schemes have a number of deficiencies. First, they are a time-consuming manual process allowing the call center to evaluate only a small sample of interactions. Second, they are prone to human error, bias or carelessness, such as evaluators not understanding performance standards, failing to enforce standards consistently, or failing to fully listen to parts of an interaction due to fatigue or other conditions. Third, they do not provide a mechanism to at least partially evaluate transactions in the absence of an evaluator.

SUMMARY

One embodiment includes a data processing system for populating selections in an evaluation operator interface, comprising a processor, a data store and a non-transitory computer readable medium. The data store is configured to store a plurality of transactions, each of the plurality of transactions comprising a voice session recording of an inbound call recorded by a call center recording system and a transcript of the voice session. The data store is further configured to store an automated scoring template having an associated lexicon and scoring parameters, a question associated with the automated scoring template and an evaluation form associated with the question.

The non-transitory computer readable medium includes instructions executable on the processor for receiving a request from a client computer for an evaluation to evaluate a transaction that was assigned an automated score according to the automated scoring template based on a transcript of the transaction having matched the lexicon and generating the evaluation from the evaluation form in response to the request for the evaluation. Generating the evaluation can comprise setting an answer control in the evaluation to a preselected answer to the question, where the preselected answer is selected from a defined set of acceptable answers to the question. The answer control can be set to the preselected answer based on the automated score for the transaction and a defined correspondence between the automated score and an acceptable answer to the question. Generating the evaluation, in one embodiment, further comprises generating page code for the question, the page code comprising question text and page code for the answer control that sets the answer control to the preselected answer. The instructions are further executable on the processor for serving the evaluation with the preselected answer to the client computer for display in an evaluation operator interface.

The defined correspondence between the automated score and the preselected answer to the question may comprise a defined correspondence between an automated score range and an acceptable answer from the set of acceptable answers. In one embodiment, an answer template defines the set of acceptable answers and the correspondence between the automated score range and the acceptable answer.

The instructions may be further executable on the processor for executing the automated scoring template to assign the automated score to the transaction. The automated scoring template may be executed in a background process in some embodiments. Executing the automated scoring template to assign the automated score to the transaction may include loading the transcript from the transaction and searching the transcript of the transaction for a word or phrase from the lexicon. Based on a determination that the transaction includes the word or phrase from the lexicon, the lexicon can be assigned a score for the transaction based on lexicon scoring parameters. The lexicon score can be added to a base score. The lexicon scoring parameters and base score may be defined in the automated scoring template. The data processing system can identify transactions to score according to the automated scoring template by searching the plurality of transactions for candidate transactions using the search criteria specified in the autoscore template.

The data processing system may further include instructions executable on the processor for receiving an evaluator answer to the question from the client computer and storing a completed evaluation. A completed evaluation can thus comprise the evaluator answer to the question and the preselected answer to the question.

The data processing system can further include instructions executable on the processor for accessing a plurality of completed evaluations for a set of transactions scored using the automated scoring template, comparing evaluator answers to the question to preselected answers to the question in the plurality of completed evaluations and determining a confidence score for the automated scoring template based on the comparison. The data processing system may further comprise instructions executable on the processor for comparing the confidence score for the automated scoring template to a confidence threshold. Based on a determination that the confidence score for the automated scoring template meets a threshold, the data processing system may continue to use the automated scoring template to score transactions from the plurality of transactions. Based on a determination that the confidence score for the automated scoring template does not meet the threshold, stopping use of the automated scoring template.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7A illustrates an embodiment of an operator interface page with controls to input question parameters.

FIG. 7B illustrates an embodiment of a second operator interface page with controls to input question parameters.

FIG. 7C illustrates an embodiment of a third operator interface page with controls to input question parameters.

FIG. 8 illustrates an embodiment of an operator interface page with controls to input answer template parameters.

FIG. 18 illustrates one embodiment of a confidence score report.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Figure 1:
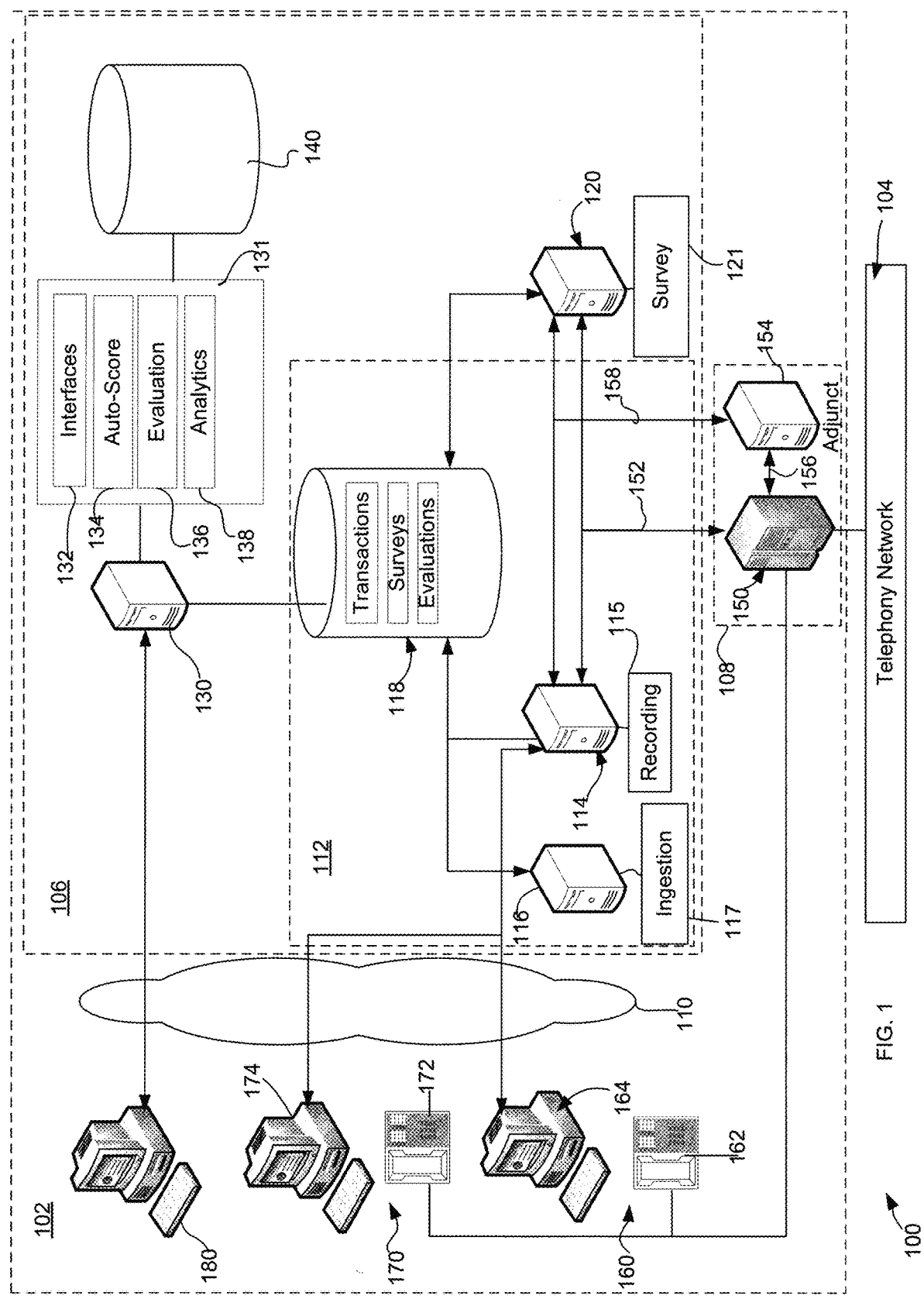
FIG. 1 is a block diagram illustrating one embodiment of a call center system coupled to telephony network.

FIG. 1 is a block diagram illustrating one embodiment of a call center system 102 coupled to telephony network 104, such as a public switched telephone network (PSTN), VoIP network or other network that can establish call sessions with call center system 102. A call center may receive a large number of calls over network 104 at any given time. These calls are transferred through system 102 and variety of actions taken with respect to the calls. Among other functionality, system 102 collects data about the calls, call center or callers during the calls. System 102 stores the audio portion of a call (referred to as a "voice session") in conjunction with data collected for the call.

Call center system 102 comprises a platform 106 coupled to a voice network 108 and a data network 110. Voice network 108 comprises a call routing system 150 to connect incoming calls to terminals in call center system 102 and outgoing calls to telephony network 104. Call routing system 150 may comprise any combination of hardware and/or software operable to route calls. According to one embodiment, call routing system 150 comprises an automatic call distributor (ACD) with interactive voice response (IVR) menus. In addition or in the alternative, call routing system 150 may include a private branch exchange switch or other call routing hardware or software.

The ACD or other call routing component may perform one or more various functions, such as recognizing and answering incoming calls, determining how to handle a particular call, identifying an appropriate agent and queuing the call, and/or routing the call to an agent when the agent is available. The call routing system 150 may use information about the call, caller or call center or other information gathered by system 102 to determine how to route a call. For example, the call routing system may use the caller's telephone number, automatic number identification (ANI), dialed number identification service (DNIS) information, the caller's responses to voice menus, the time of day, or other information to route a call. The call routing system 150 may communicate with data network 110, a private branch exchange or other network either directly or indirectly, to facilitate handling of incoming calls. The call routing system 150 may also be operable to support computer-telephony integration (CTI).

Call routing system 150 may be coupled to recording server 114 and a survey server 120 of platform 106 by communications lines 152. Lines 152 support a variety of voice channels that allow platform 106 to monitor and record voice sessions conducted over a voice network 108. Call routing system 150 may also be coupled to a voice instrument 162 at agent workstation 160 and a voice instrument 172 at supervisor workstation 170 via a private branch exchange link, VoIP link or other call link. Platform 106 may receive information over lines 152 regarding the operation of call routing system 150 and the handling of calls received by system 102. This information may include call set-up information, traffic statistics, data on individual calls and call types, ANI information, DNIS information, CTI information, or other information that may be used by platform 106.

Voice network 108 can further include adjunct services system 154 coupled to call routing system 150, call recording server 114 and survey server 120 by data links 156, 158. Adjunct services system 154 may comprise a CTI application or platform, contact control server, or other adjunct device accessible by platform 106 to perform call center functions. Adjunct services system 154 may include a link to other components of the call center's management information system (MIS) host for obtaining agent and supervisor names, identification numbers, expected agent schedules, customer information, or any other information relating to the operation of the call center.

Data network 110 may comprise the Internet or other wide area network (WAN), an enterprise intranet or other a local area network (LAN), or other suitable type of link capable of communicating data between platform 106 and computers 164 at agent workstations 160, computers 174 at supervisor workstations 170 and client computers 180 of other types of users. Data network 110 may also facilitate communications between components of platform 106. Although FIG. 1 illustrates one agent workstation 160, one supervisor workstation 170 and one additional user computer 180, it is understood that call center 102 may include numerous agent workstations 160, supervisor workstations 170 and user computers 180. Computers 164, 174 and 180 may be generally referred to as user client computers.

Platform 106 includes a recording system 112 to record voice sessions and data sessions. In the embodiment illustrated, recording system 112 includes a recording server 114 and an ingestion server 116. Recording server 114 comprises a combination of hardware and/or software (e.g., recording server component 115) operable to implement recording services to acquire voice interactions on VoIP, TDM or other networks, record the voice sessions. Recording server 114 may also be operable to record data sessions for calls. A data session may comprise keyboard entries, screen display and/or draw commands, video processes, web/HTTP activity, e-mail activity, fax activity, applications or any other suitable information or process associated with a client computer. To facilitate recording of data sessions, agent computers 164 or supervisor computers 174 may include software to capture screen interactions related to calls and send the screen interactions to recording server 114. Recording server 114 stores session data for voice and data sessions in transaction data store 118.

Ingestion server 116 comprises a combination of hardware and software (e.g., ingestion server component 117) operable to process voice session recordings recorded by recording server 114 or live calls and perform speech-to-text transcription to convert live or recorded calls to text. Ingestion server 116 stores the transcription of a voice session in association with the voice session in data store 118.

Platform 106 further comprises survey server 120. Survey server 120 comprises a combination of hardware and software (e.g., survey component 121) operable to provide post-call surveys to callers calling into call center 102. For example, survey server 120 can be configured to provide automated interactive voice response (IVR) surveys. Call routing system 150 can route calls directly to survey server 120, transfer calls from agents to survey server 120 or transfer calls from survey server 120 to agents. Survey data for completed surveys can be stored in data store 118.

Data store 118 may also store completed evaluations. Platform 106 may include an evaluation feature that allows an evaluator to evaluate an agent's performance or the agent to evaluate to evaluate his or her own performance. An evaluation may be performed based on a review of a recording. Thus, an evaluation score may be linked to a recording in data store 118.

In operation, call routing system 150 initiates a session at call center system 102 in response to receiving a call from telephony network 104. Call routing system 150 implements rules to route calls to agent voice instruments 162, supervisor voice instruments 172, recording server 114 or survey server 120. Depending on the satisfaction of a variety of criteria (e.g., scheduling criteria or other rules), routing system 150 may establish a connection using lines 152 to route a call to a voice instrument 162 of an agent workstation 160 and recording server 114. Routing system 150 may also establish a connection for the call to the voice instrument 172 of a supervisor.

Recording server 114 stores data received for a call from adjunct system 154 and routing system 150, such as call set-up information, traffic statistics, call type, ANI information, DNIS information, CTI information, agent information, MIS data. In some cases, recording server 114 may also store a recording of the voice session for a call. Additionally, recording sever may record information received from agent computer 164 or supervisor computer 174 with respect to the call such as screen shots of the screen interactions at the agent computer 164 and field data entered by the agent. For example, platform 106 may allow an agent to tag a call with predefined classifications or enter ad hoc classifications and recording server may store the classifications entered by the agent for a call.

Recording server 114 stores data and voice sessions in data store 118, which may comprise one or more databases, file systems or other data stores, including distributed data stores. Recording server 114 stores a voice session recording as a transaction in data store 118. A transaction may comprise transaction metadata and associated session data. For example, when recording server 114 records a voice session, recording server 114 can associate the recording with a unique transaction id and store a transaction having the transaction id in data store 118. A data session may also be linked to the transaction id. Thus, the transaction may further include a recording of a data session associated with the call, such as a series of screen shots captured from the agent computer 164 during a voice session. The transaction may also include a transcript of the voice session recording created by ingestion server 116. In some embodiments, the voice session may be recorded as separate recordings of the agent and caller and thus, a transaction may include an agent recording, a customer recording, a transcript of the recording of the agent (agent transcript) and a transcript of the recording of the customer (inbound caller transcript). According to one embodiment, the voice session recording, transcript of the voice session or data session recording for a call may be stored in a file system and the transaction metadata stored in a database with pointers to the associated files for the transaction.

Transaction metadata can include a wide variety of metadata stored by recording server 114 or other components. Transaction metadata may include, for example metadata provided to recording server 114 by routing system 150 or adjunct system 154, such as call set-up information, traffic statistics, call type, ANI information, DNIS information, CTI information, agent information, MIS data or other data. For example, the transaction metadata for a call may include call direction, line on which the call was recorded, ANI digits associated with the call, DNIS digits associated with the call, extension of the agent who handled the call, team that handled the call (e.g., product support, finance), whether the call had linked calls, name of agent who handled the call, agent team or other data. The transaction metadata may further include data received from agent computers 164, supervisor computers 174, or other components, such as classifications (pre-defined or ad hoc tag names) assigned to the call by a member, classification descriptions (descriptions of predefined or ad hoc tags assigned by a call center member to a call) other transaction metadata. The transaction metadata may further include call statistics collected by recording server 114, such as the duration of a voice session recording, time voice session was recorded and other call statistics. Furthermore, other components may add to the transaction metadata as transactions are processed. For example, transaction metadata may include scores assigned by intelligent data processing system 130. Transaction metadata may be collected when a call is recorded, as part of an evaluation process, during a survey campaign or at another time. As one of skill in the art will appreciate, the foregoing transaction metadata is provided by way of example and a call center system may store a large variety of transaction metadata.

Intelligent data processing system 130 provides a variety of services such as support for call recording, performance management, real-time agent support, and multichannel interaction analysis. Intelligent data processing system 130 can comprise one or more computer systems with central processing units executing instructions embodied on one or more computer readable media where the instructions are configured to perform at least some of the functionality associated with embodiments of the present invention. These applications may include a data application 131 comprising one or more applications (instructions embodied on a computer readable media) configured to implement one or more interfaces 132 utilized by the data processing system 130 to gather data from or provide data to client computing devices, data stores (e.g., databases or other data stores) or other components. Interfaces 132 may include interfaces to connect to various sources of unstructured information in an enterprise in any format, including audio, video, and text. It will be understood that the particular interface 132 utilized in a given context may depend on the functionality being implemented by data processing system 130, the type of network utilized to communicate with any particular system, the type of data to be obtained or presented, the time interval at which data is obtained from the entities, the types of systems utilized. Thus, these interfaces may include, for example web pages, web services, a data entry or database application to which data can be entered or otherwise accessed by an operator, APIs, libraries or other type of interface which it is desired to utilize in a particular context.

Data application 131 can comprise a set of processing modules to process data obtained by intelligent data processing system 130 (obtained data) or processed data to generate further processed data. Different combinations of hardware, software, and/or firmware may be provided to enable interconnection between different modules of the system to provide for the obtaining of input information, processing of information and generating outputs. In the embodiment of FIG. 1, data application 131 includes an automated scoring module ("autoscore module") 134, an evaluation module 136 and a analytics module 138. Autoscore module 134 implements processes for automated scoring of transactions (autoscoring) in data store 118. Evaluation module implements processes to allow evaluation designers to design evaluations and processes to provide evaluations to evaluators to allow the evaluators to evaluate agents. Analytics module 138 implements processes to analyze reports based on the results of evaluations.

Intelligent data processing system 130 can include a data store 140 that stores various templates, files, tables and any other suitable information to support the services provided by data processing system 130. Data store 140 may include one or more databases, file systems or other data stores, including distributed data stores.

Figure 2:
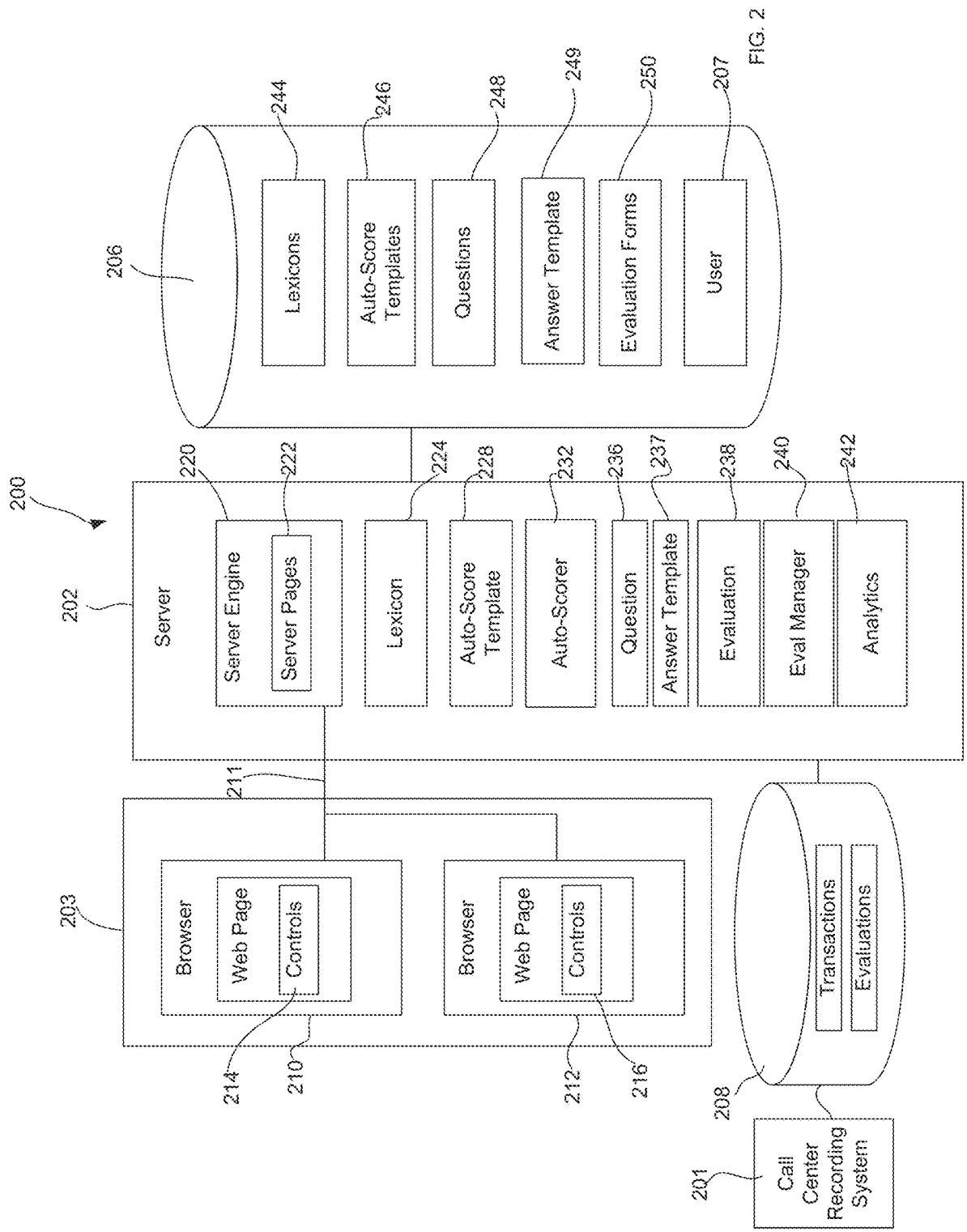
FIG. 2 is a diagrammatic representation of one embodiment of an evaluation system.

FIG. 2 is a diagrammatic representation of one embodiment of an evaluation system 200 operable to access transactions from a call center call recording system 201, such as recording system 112, and provide tools to evaluate the transactions. Call center recording system 201 may be any suitable recording system that records and transcribes calls between agents and incoming callers. By way of example, but not limitation, call center recording system 201 may comprise one or more servers running OPEN TEXT QFINITI Observe and Explore modules by OPEN TEXT CORPORATION of Waterloo, Ontario, Canada.

Evaluation system 200 comprises a server tier 202, a client tier 203, a data store 206 and a data store 208. The client tier 203 and server tier 202 can connected by a network 111. The network 111 may comprise the Internet or other WAN, an enterprise intranet or other LAN, or other suitable type of link capable of communicating data between the client and server platforms. According to one embodiment, server tier 202 and data store 206 may be implemented by intelligent data processing system 130 and data store 140, client tier 203 may be implemented on one or more client computers, such as computers 180, and data store 208 may be an example of data store 118 that stores a set of transactions, survey results and evaluation results. Each transaction may comprise transaction metadata and a voice session recording of an inbound call recorded by a call center recording system. Each transaction may further include a transcript of the voice session. Each transaction may further include a data session recording. The transaction metadata for each transaction can comprise an identifier for that transaction and other metadata.

Server tier 202 comprises a combination of hardware and software to implement platform services components comprising sever engine 220, server-side lexicon component 224, server-side autoscore template component 228, server-side autoscore processor ("auto scorer") 232, server-side question component 236, server-side answer template component 237, server-side evaluation component 238, evaluation manager 240 and server-side analytics component 242. According to one embodiment, lexicons, autoscore templates, questions, answer templates, and evaluation forms may be implemented as objects (e.g., lexicon objects, template objects, question objects, evaluation form objects) that contain data and implement stored procedures. Thus, lexicon component 224 may comprise lexicon objects, server-side autoscore template component 228 may comprise autoscore template objects, server-side question component 236 may comprise question objects, answer template component 237 may comprise answer template objects and server-side evaluation component 238 may comprise evaluation form objects.

Data store 206 may comprise one or more databases, file systems or other data stores, including distributed data stores. Data store 206 may include user data 207 regarding users of a call center platform, such as user names, roles, teams, permissions and other data about users (e.g., agents, supervisors, designers). Data store 206 may further include data to support services provided by server tier 202, such as lexicons 244, autoscore templates 246, questions 248 and evaluation forms 250. According to one embodiment, lexicons 244 comprise attributes of lexicon objects, autoscore templates 246 comprise attributes of autoscore template objects, questions 248 comprise attributes of question objects, answer templates 249 comprise attributes of answer template objects and evaluation forms 250 comprise attributes of evaluation objects.

Client tier 203 comprises a combination of hardware and software to implement designer operator interfaces 210 for configuring lexicons, autoscore templates, questions, answer templates, evaluation forms, analytics and evaluator operator interfaces 212 for evaluating transactions. Designer operator interfaces 210 include controls 214 that allow designers to define lexicons, autoscore templates, questions, answer templates or evaluation forms and configure analytics. Evaluation operator interfaces 212 comprise controls 216 that allow users to evaluate recordings of interactions. Designer operator interfaces 210 and evaluation operator interfaces 212 can comprise one or more web pages that include scripts to provide controls 214 and controls 216. To this end server tier 202 can comprise a sever engine 220 configured with server pages 222 that include server-side scripting and components. The server-side pages 222 are executable to deliver application pages to client tier 203 and process data received from client tier 203. The server-side pages 222 may interface with server-side lexicon component 224, autoscore template component 228, question component 236, answer template component 237, evaluation component 238, evaluation manger 240 and analytics component 242.

Figure 3:
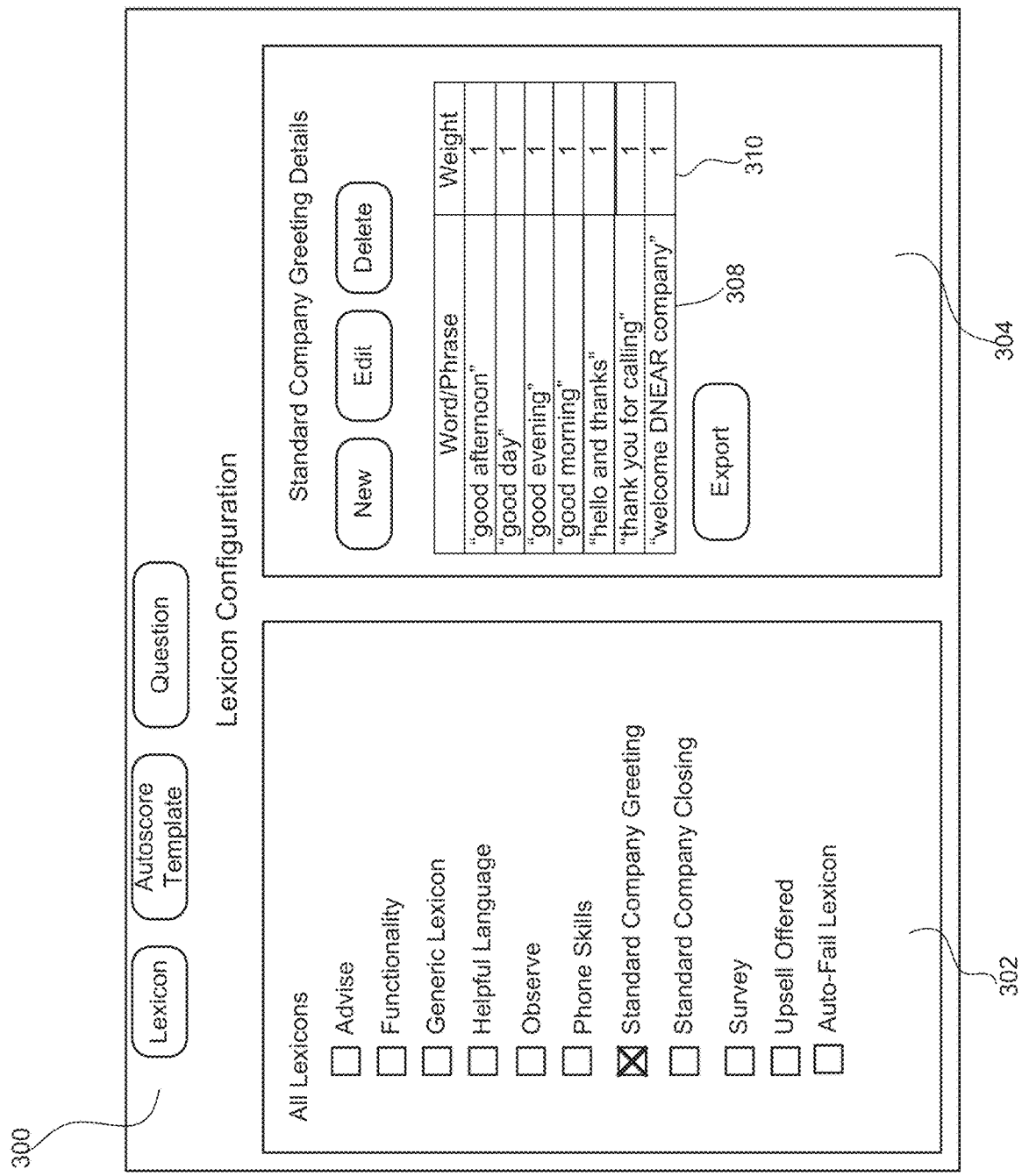
FIG. 3 illustrates one embodiment of an operator interface page with controls to allow a user to create a lexicon.

Server engine 220 and lexicon component 224 cooperate to provide a designer operator interface 210 that allows a user to create new lexicons 244 or perform operations on existing lexicons 244. FIG. 3, for example, illustrates an example of a designer operator interface page 300 with controls to allow a designer to define a new lexicon, edit an existing lexicon or delete a lexicon. Interface page 300 presents a list of existing lexicons 302 that allows a user to select a lexicon to edit or delete and a lexicon configuration tool 304 that allows the user to create a new lexicon, edit an existing lexicon or delete an existing lexicon. If a user selects to create a new lexicon, lexicon component 224 can assign the new lexicon a unique identifier to identify the lexicon in data store 206. The designer assigns the lexicon a name for ease of searching.

For a lexicon, the designer can specify lexicon parameters, such as a name, description and a set of lexicon entries. Each lexicon entry includes words or phrases 310 that evaluation system 200 applies to a recording of an agent interaction to determine if the agent interaction contains the word or phrases. A lexicon entry may include search operators, such as "welcome DNEAR company1" to indicate that the evaluation system should search for any combination of "welcome" and "company1" within a pre-defined word proximity to each other. Thus, a lexicon may include a word, phrase or search statement. Each entry may further include a lexicon entry weight 308, such as a weight of 0-1.

Returning briefly to FIG. 2, server tier 202 may thus receive lexicon data based on interactions with operator interface 210. A lexicon configured via operator interface 210 may be stored as a lexicon 244 in data store 206. Lexicons may be stored as records in one or more tables in a database, files in a file system or combination thereof or according to another data storage scheme. Each lexicon can be assigned a unique identifier and comprise a variety of lexicon parameters.

Lexicons may be used by autoscore templates to score transactions. Server engine 220 and autoscore template component 228 cooperate to provide a designer operator interface 210 that allows a user to create new autoscore templates 246 or perform operations on existing autoscore templates 246 (e.g., edit or delete an existing autoscore template). If a user selects to create a new autoscore template, autoscore template component 228 can assign the new autoscore template a unique identifier to uniquely identify the template in data store 206. Each autoscore template 246 can comprise a variety of autoscore template data.

Figure 4:
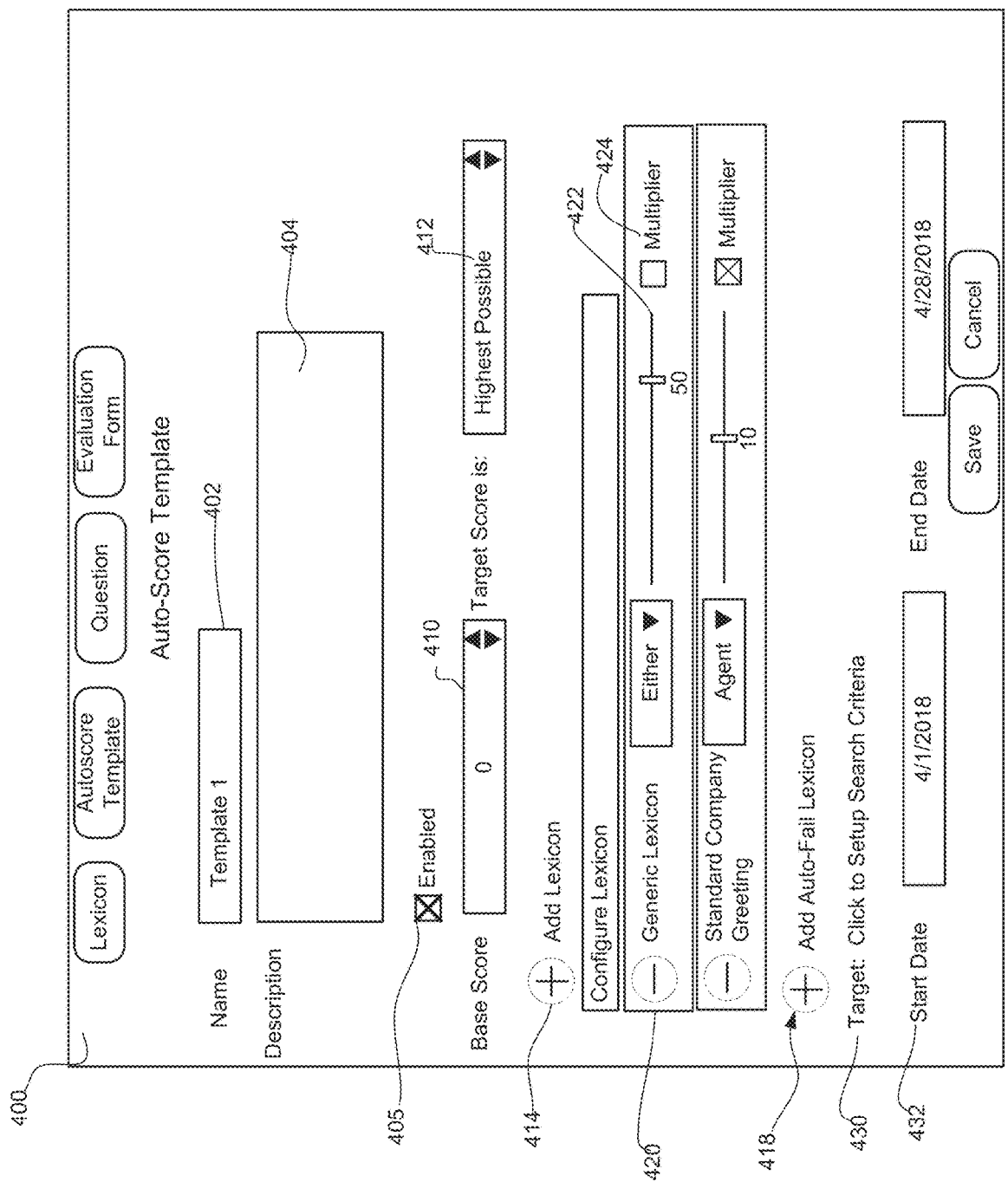
FIG. 4 illustrates an example of an operator interface page with controls to input parameters of for an automated scoring template.
Figure 5:
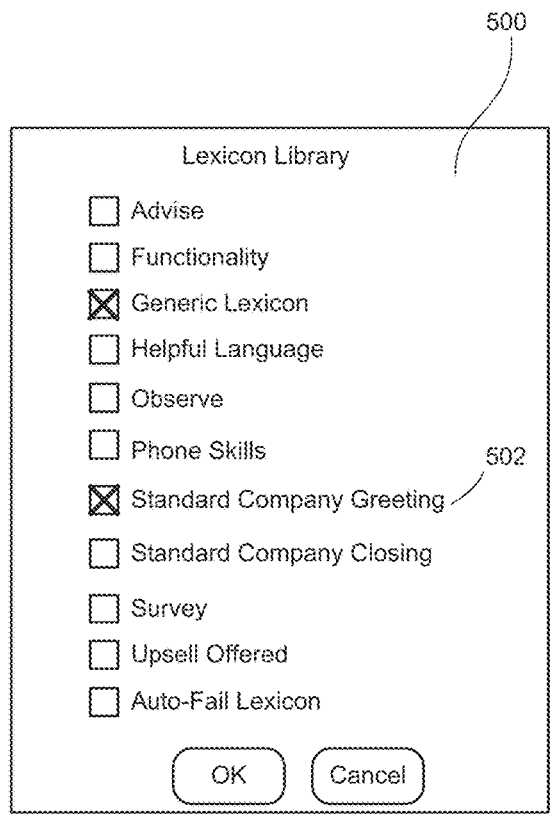
FIG. 5 illustrates an example of an operator interface page with controls to associate a lexicon with an automated scoring template.
Figure 6:
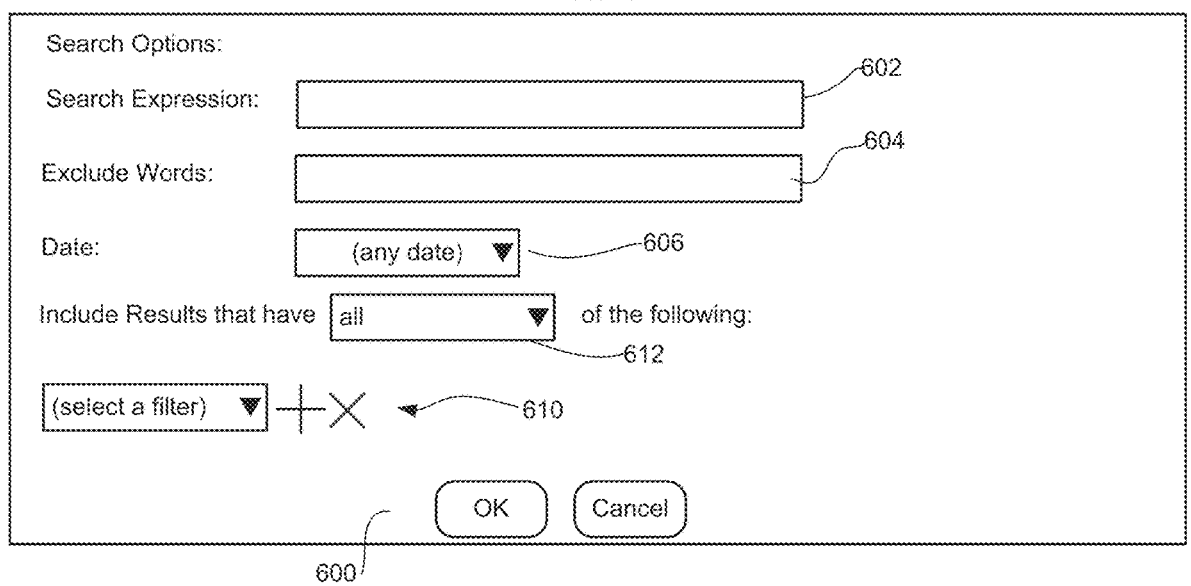
FIG. 6 illustrates an embodiment of an operator interface page with controls to input search criteria for an automated scoring template.

FIG. 4, FIG. 5 and FIG. 6 illustrate example embodiments of operator interface pages with controls to specify template parameters for an autoscore template. In the embodiment illustrated in FIG. 4, the designer operator interface page 400 provides controls 402 and 404 to allow the user to provide a template name 402 and brief description for ease of searching. Enable control 405 allows the user to specify that the template is available to be processed by auto scorer 232.

An autoscore template can include a lexicon and scoring parameters. To this end, operator interface page 400 includes controls that allow a user to associate lexicons with the autoscore template, specify gross scoring parameters and lexicon specific scoring parameters. In FIG. 4, gross scoring controls include base score control 410 and target score control 412. Base score control 410 allows the designer to input the score that will be assigned according to the template if no scores are added or subtracted based on the application of lexicons. Points based on the application of lexicons associated with the autoscore template are added or subtracted from this score when the template is applied. A target score control 412 allows the user to select a final score calculation algorithm from a plurality of predefined final score calculation algorithms to be applied when the autoscore template is applied to an interaction. For example, the evaluation system 200 may support multiple calculation methods, such as:

Highest possible: The score for the associated lexicon with the highest score is added to the base score. Results for other lexicons are ignored.

Lowest possible. The score for the associated lexicon with the lowest score is added to the base. Results for other lexicons are ignored.

Cumulative scoring. The scores for all associated lexicons are added to the base score.

The target score control 412 can allow the user to select which method should be applied. It can be noted that, in this embodiment, when only one associated lexicon is used in the template, the target scoring setting may have no effect on the final score.

Designer operator interface page 400 further includes controls 414 and 418 to allow the user to associate one or more lexicons of lexicons 244 with the autoscore template. For example, by clicking on "Add Lexicon" or "Add Auto-Fail Lexicon," the user can be presented with an operation interface 210 that provides controls to allow the user to select lexicons from the library of lexicons 244 to add to the autoscore template. FIG. 5, for example, illustrates one embodiment of an operator interface page 500 having controls that allow the user to select which lexicons from lexicons 244 to associate with the autoscore template.

Returning to FIG. 4, the operator interface page 400 shows that, in this example, the autoscore template is linked to the lexicons "Generic Lexicon" and "Standard Company Greeting" selected via operator interface 400 and includes lexicon specific controls 420 to set lexicon specific scoring parameters for each lexicon associated with the autoscore template. The lexicon specific controls include lexicon channel controls and lexicon weight controls. The lexicon channel control 419, for example, allows the user to select the channel to which the associated lexicon will apply—that is, whether the associated lexicon is to be applied to the agent channel, incoming caller channel, or both ("either") when the autoscore template is executed. Further, controls 422 and 424 can be used to set additional lexicon scoring parameters. Slider 422, for example, provides a control to set the lexicon weight value for the "Generic Lexicon" for "Template 1". The weight value may be positive or negative, for example plus or minus 100 points, and indicates how many points are to be assigned if the specified channel of a transaction to which the autoscore template is applied matches the lexicon.

When the template is applied by auto scorer 232, point values for the template begin with the specified base score 410 and then points are added or deducted based on behavior that matches each specified lexicon and the lexicon weight value specified for the lexicon in the autoscore template. The autoscore template can be configured so that different point values are added to or subtracted from the base score by selecting a positive or negative lexicon weight. Multiplier control 424 allows the user to specify how points for the specific lexicon are applied when the auto-template is used to evaluate a transaction. If the multiplier is enabled the designated number of points defined by the lexicon weight value are added to or subtracted from the base score 410 each time behavior, defined by the lexicon, is exhibited by the specified speaker. If the multiplier is not enabled, the number of points defined by the lexicon weight value is added to or subtracted from the base score 410 only the first time the speaker is specified by control 419 for the lexicon matches the lexicon.

In the illustrated example, a transaction to which the autoscore template is applied will be awarded fifty points if either the agent or incoming caller transcript matches any of the entries in the "Generic Lexicon" regardless of how many entries in Generic Lexicon the transaction transcripts match. On the other hand, the transaction is awarded 10 points for every entry in "Standard Company Greeting" that the agent transcript matches. As there are seven entries in the "Standard Company Greeting" lexicon according to the example of FIG. 3, a transaction can be awarded up to seventy points based on the "Standard Company Greeting" lexicon according to the autoscore template of FIG. 4. In another embodiment, when the multiplier is enabled for a lexicon, the transaction is awarded points for every instance in the recording that matches any entry in the "Standard Company Greeting." Thus, if the agent said "thank you for calling" a number of times, the transaction could be awarded ten points for each instance of "thank you for calling." Using the examples of FIG. 3 and FIG. 4, if the agent said "thank you for calling" six times, the lexicon score for the "Company Standard Greeting" lexicon can be increased by sixty (once for each instance of "thank you for calling.")

Further, in some embodiments, the points awarded for matching an entry in a lexicon may be further weighted by the entry weight for that entry (e.g., as specified by weights 310). In any event, the evaluation system may limit the final score that a transaction can be awarded to a particular range, such as 0-100.

Using control 418, the user may designate an auto-fail lexicon for the template. If, in a transaction to which the autoscore template is applied, the transcript for the channel specified for the auto-fail template uses words that match the specified auto-fail lexicon, the final score for the transaction for the template can be zero, regardless of other lexicon scores awarded by the template.

Target control 430 allows the user to specify the transactions to which the template will be applied. In this case, when the user clicks on the text of target control 430, the evaluation system 200 presents an operator interface page that displays a search options interface, one example of which is illustrated in FIG. 6.

Turning briefly to FIG. 6, FIG. 6 illustrates one embodiment of an operator interface page 600 used to specify the transactions to which the autoscore template will apply. More particularly, interface page 600 allows the user to specify search criteria that auto scorer 232 applies to determine the transactions to which to apply the associated autoscore template. In the embodiment illustrated, operator interface page 600 includes search expression control 602 that allows the user to provide search expressions for searching transactions. According to one embodiment, only transactions that meet the search expression (or exact words) are returned. Operator interface page 600 further includes exclude words control 604 that allows the user to specify that transactions that include the words provided should be excluded. In one embodiment, the user may select a lexicon from a drop down menu so that transactions that include words in the selected lexicon are excluded. Date control 606 allows the user to input a date range for calls to be included. Additional filter options controls 610 allow the user to input additional filter options for selecting transactions to which the autoscore template applies. For example, if the call center classifies transactions by type, such as "sales calls" or "service calls," the user can specify that only transactions corresponding to sales calls should be included. Control 612 allows the user to specify whether a transaction can meet "any" of the additional filter criteria or must meet "all" of the additional filter criteria to be included in the results to which the template applies.

Returning to FIG. 4, interface page 400 further includes an execution data range control 432 that allows a user to specify the date range during which the template is active. The execution date range controls when auto scorer 232 executes the template.

Returning briefly to FIG. 2, server tier 202 may thus receive autoscore template data via interactions in operator interface 210. An autoscore template configured via operator interface 210 can be persisted as an autoscore template 246 in data store 206. Autoscore templates 246 may be stored as records in one or more tables in a database, files in a file system or combination thereof or according to another data storage scheme. Each autoscore template may be assigned a unique identifier and comprise a variety of autoscore template parameters.

In general, evaluation instances (evaluations) are created from evaluation forms that define the questions and other content in the evaluations. A page of the operator interface may allow a user to select to create new questions, edit an existing question 248 or delete an existing question 248. If the user selects to create or edit the question the user may be presented with an operator interface page that allows the user to question parameters for the question.

Figures 9, 10, 11:
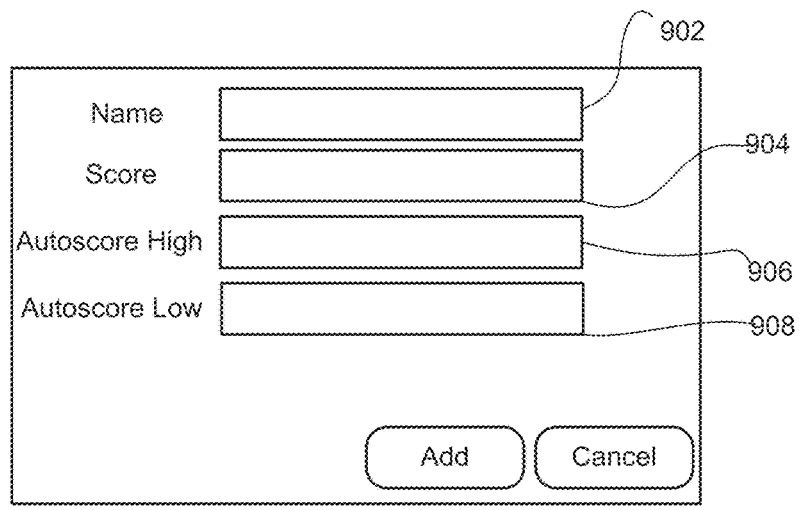
FIG. 9 illustrates an embodiment of an operator interface page with controls to define correspondences between acceptable answers to a question and automated scores.
FIG. 10 illustrates an example of correspondences between acceptable answers to a question and automated scores.
FIG. 11 illustrates another example of correspondences between acceptable answers to a question and automated scores.

Server engine 220, question component 236 and answer template component 237 cooperate to provide an operator interface 210 that allows a user to define questions 248 and answer templates 249. FIG. 7A, FIG. 7B and FIG. 7C, for example, illustrate embodiments of operator interface pages 700, 750, 770 for specifying question parameters and FIG. 8 and FIG. 9 illustrate embodiments of specifying template parameters for an answer template.

Turning to FIG. 7A, interface page 700 includes control 702 to allow the user to name a question, control 704 to allow the user to enter question text and control 706 to allow the user to enter a scoring tip. The question text and scoring tip are incorporated into an evaluation page when an evaluator evaluates a transcript using an evaluation form that incorporates the question. The evaluator scoring tip information provides guidance to the evaluator on how to score the question. Publish control 710 in operator interface page 700 (or operator interface pages 750, 770) allows the user to indicate that the question can be used in an evaluation form.

Operator interface page 750 allows the user to provide answer parameters for the question specified in operator interface page 700. Operator interface page 750 includes an answer type control 752 that allows the user to specify what type of control will appear in the evaluation presented to an evaluator. Answer controls are included in the evaluation page based on the answer type selected. Examples of answer controls include, but are not limited to radio buttons, drop down list, edit box and multi-select.

A question may include an answer template. Answer template control 754, for example, allows the user to associate the question with an existing answer template or a new answer template with the question. The user can add, edit or delete a selected answer template (e.g., an answer template selected from answer templates 249). The answer template control 754 may limit the answer templates from which the user may select based on the type selected in control 752.

Operator interface page 750 further includes an autoscore range portion 755 from the selected answer template. Autoscore ranges are discussed further below.

Control 756 allows the user to select whether autoscoring will apply to the question. Control 758 further allows the user to select the autoscore template that the question applies. The user can, for example, select an autoscore template from autoscore templates 246. If the user selects to enable autoscore, then the evaluation system can autoscore transactions for the question based on the specified autoscore template and, for an evaluation that incorporates the question, evaluation system 200 can automatically populate the evaluation with an autoscore auto answer. If the user selects not to use autoscoring, then the acceptable answers and question scores of a selected answer template will apply, but evaluation system 200 will not automatically assign question scores to transactions for the question and will not generate an autoscore auto answer for evaluations that incorporate the question.

FIG. 7C illustrates one embodiment of an operator interface page 770 for specifying additional question settings. Control 772, for example, allows the user to select whether a non-autoscore auto answer applies in cases in which autoscore is not enabled for the question. A non-autoscore auto answer assigns a preset value as an answer for the purpose of saving time for evaluators on question with commonly-used answers, but are not generated based on autoscoring. Control 774 allows the user to set the preset answer when auto answer is enabled via control 772.

Further the user can set a target answer using control 776. The target answer is the preferred answer to a question and can be used for further evaluation and analysis purposes. The target answer may be selected from the acceptable answers for the question. For example, if a question incorporates the auto-ranges of FIG. 10, the target answer can be selected from "Yes" or "No."

As discussed above, a question may include an answer template by, for example, referencing the answer template. FIG. 8 illustrates one embodiment of an operator interface page 800 for defining an answer template. Answer template settings are applied to each question that includes the template (e.g., as specified using control 754 for the question). Operator interface page 800 provides a control 802 that allows a user to input a name for an answer template and a control 804 that allows a user to input a description of an answer template. Operator interface page 800 further includes an answer type control 806 that allows the user to specify what type of control will appear in the evaluation presented to an evaluator. Examples include, but are not limited to radio buttons, drop down list, edit box and multi-select.

Operator interface page 800 further includes controls to allow a user to add autoscore ranges. If the user selects to add an autoscore range, the user can be presented with an operator interface page that allows the user to input an autoscore range. FIG. 9 is a diagrammatic representation of one embodiment of an operator interface page 900 that allows a user to input an autoscore range. Operator interface page 900 includes a name control 902, a score control 904, an autoscore high value control 906 and an autoscore low value control 908. In the name box 902, the user can enter an acceptable answer that may be selected by an evaluator. In the score box 904, the user can enter a question score for that acceptable answer (the score that will be awarded to a transaction for the question should the evaluator select that answer when evaluating a transaction). Using autoscore high control 906 and autoscore low value control 908, the user can specify values above and below which the autoscore range is not applied. By specifying an autoscore range for an acceptable answer, the user provides a correspondence between automated scores and acceptable answers to a question.

FIG. 10 provides one example of autoscore ranges for an answer template. In this example, an answer template specifies "Yes" and "No" as the acceptable answers and provides a correspondence between each acceptable answer and a range of autoscores. For the sake of example, it is assumed that the answer template is associated with a yes/no question for which autoscore is enabled and an autoscore template is specified. If an evaluation of a transaction incorporates the yes/no question and the autoscore for the transaction is 95 according to the autoscore template specified for the question, evaluation system 200, when generating the evaluation, can automatically preselect the answer "yes" based on the correspondence between 95 and the acceptable answer "yes" so that the answer is pre-populated when the evaluation is displayed to the evaluator. Otherwise, if the autoscore for the transaction is less than 90, evaluation system 200, automatically preselect the answer "no".

FIG. 11 provides another example of autoscore ranges for an answer template. In the example of FIG. 11, any question using the answer template has five acceptable answers "Excellent," "Exceeds Expectations," "Meets Expectations," "Needs Improvement" and "Poor." If an evaluation of a transaction includes a question to which the answer template applies and the transaction is assigned an autoscore of 81-100 (again assuming autoscore is enabled for the question and an autoscore template is specified), evaluation system 200 will automatically pre-populate the evaluation with the answer "Excellent". Similarly, if the autoscore is 0-20 or 61-80, evaluation system 200 can automatically prepopulate the evaluation with the answers "Poor" or "Exceeds Expectations" accordingly. If the autoscore for the question is 21-60, the evaluation system does not prepopulate an answer to the question unless a non-autoscore auto-answer is otherwise specified for the question.

Referring briefly to FIG. 2, server tier 202 may thus receive question data and answer template data via interactions in operator interface 210. A question configured via operator interface 210 can be persisted as question 248 in data store 206 and an answer template configured via operator interface 210 can be persisted as an answer template 249 in data store 206. Questions 248 and answer templates 249 may be stored as records in one or more tables in a database, files in a file system or combination thereof or according to another data storage scheme. Each question 248 can be assigned a unique identifier and comprise a variety of question parameters, including answer parameters for the question. Similarly, each answer template can be assigned a unique identifier and comprise a variety of answer template parameters.

Figure 12A:
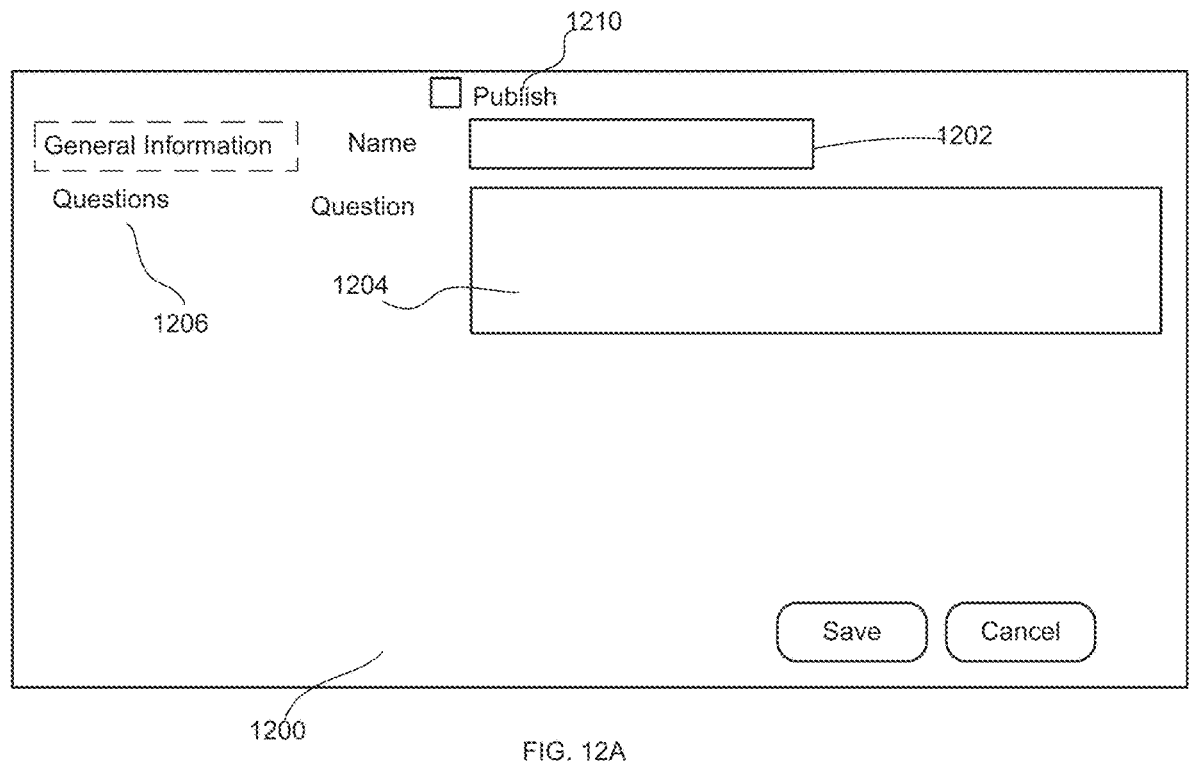
FIG. 12A illustrates an embodiment of an operator interface page with controls to input evaluation form parameters.

Instances of questions 248 may be incorporated in evaluations created from evaluation forms 250. Server engine 220 and evaluation component 238 cooperate to provide an operator interface 210 that allows a user to define evaluation forms 250. FIG. 12A is a diagrammatic representation of one embodiment of an operator interface page 1200 for defining an evaluation form. Form field 1202 allows a user to input an evaluation form name and form field 1204 allows the user to input a description of the evaluation form. Menu item 1206 allows the user to select questions from a library of questions, such as questions 248. Publish control 1210 provides a control that allows the user to indicate that the evaluation system 200 can send evaluations according to the evaluation form to evaluators.

Figure 12B:
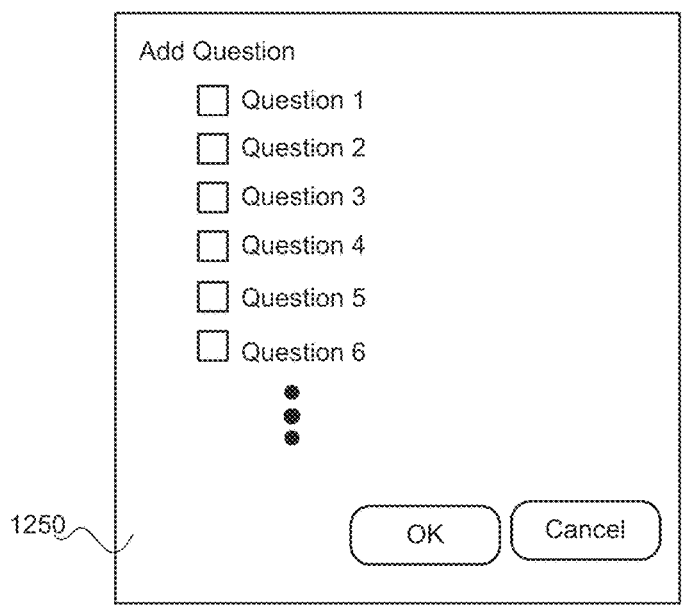
FIG. 12B illustrates an embodiment of an operator interface page with controls to associate questions to an evaluation form.

Responsive to the user selecting to add questions to the evaluation form (e.g., responsive to user interaction with menu item 1206), the user can be presented with a question library interface page 1250 (FIG. 12B) that provides controls to allow the user to select questions from the library of questions 248 to link to the evaluation form. Based on the inputs reviewed via interaction with interface page 1250, the evaluation system associates selected questions from question 248 with the evaluation form.

Returning briefly to FIG. 2, server tier 202 may thus receive evaluation form data based on interactions with operator interface 210. An evaluation form configured via operator interface 210 can be persisted as an evaluation form 250 in data store 206. Evaluation forms 250 may be stored as records in one or more tables in a database, files in a file system or combination thereof or according to another data storage scheme. Each evaluation form 250 can be assigned a unique identifier and comprise a variety of evaluation form data.

Server tier 202 further comprises auto scorer 232 which scores transactions according to autoscore templates 246. According to one embodiment, auto scorer 232 may run as a background process that accesses transactions in data store 208 and autoscores the transactions. The autoscores generated by auto scorer 232 may be stored in transaction metadata in data store 208 or elsewhere. In any event, the autoscores can be stored in a manner that links an autoscore generated for transaction to the autoscore template that was used to generate the autoscore.

Server engine and evaluation manager 240 cooperate to provide evaluations to evaluators based on evaluation forms 250. The evaluations may be displayed, for example, in operator interface 212. Evaluation manager 240 can user pre-generated autoscores (that is, autoscores determined before the evaluation was requested) or autoscores generated in real time when the evaluation is requested to prepopulate answers in the evaluations.

More particularly, based on a request for an evaluation to evaluate a transaction, the evaluation manager 240 accesses the evaluation form 250, a question 248 included in the evaluation form and an answer template 249 included in the question 248 and determines an autoscore template 246 associated with the question 248. Evaluation manager 240 further accesses the transaction or other record to determine the autoscore assigned to the transaction based on the autoscore template 246. Using the autoscore assigned to the transaction based on the autoscore template and the correspondences of autoscores to acceptable answers in the answer template 249 the evaluation system can preselect an acceptable answer to the question. Evaluation manager sets an answer control in the evaluation to the preselected answer and provides the evaluation to the evaluator with the preselected answer.

Figure 13:
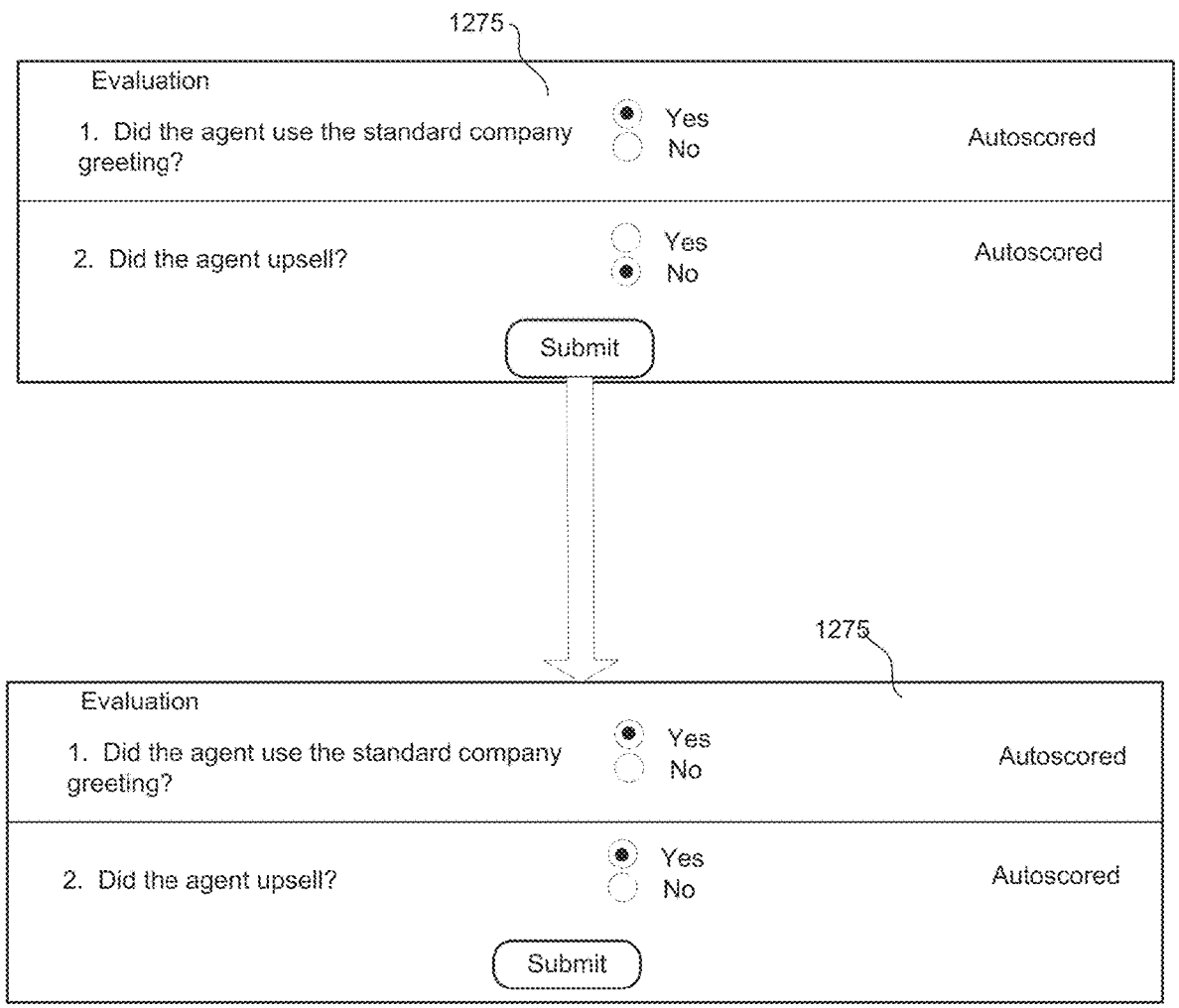
FIG. 13 illustrates an example embodiment of an evaluation with a preselected answer and evaluator submitted answers.

FIG. 13 illustrates one embodiment of an evaluation operator interface page 1275 including an evaluation. In this example, the selection of the answer "Yes" is preset for the question "Did the agent use the standard company greeting?" and the selection of the answer "no" is preset for the question "Did the agent upsell?" when the evaluation is sent to the evaluator. These answers are prepopulated based on the autoscores assigned to the transaction by autoscore templates associated with the questions. It can be noted, however, the evaluator may choose a different answer than the prepopulated autoscore auto answer. One advantage of using pre-generated autoscores is that transactions can be autoscored in batch by auto scorer 232.

Figure 14:
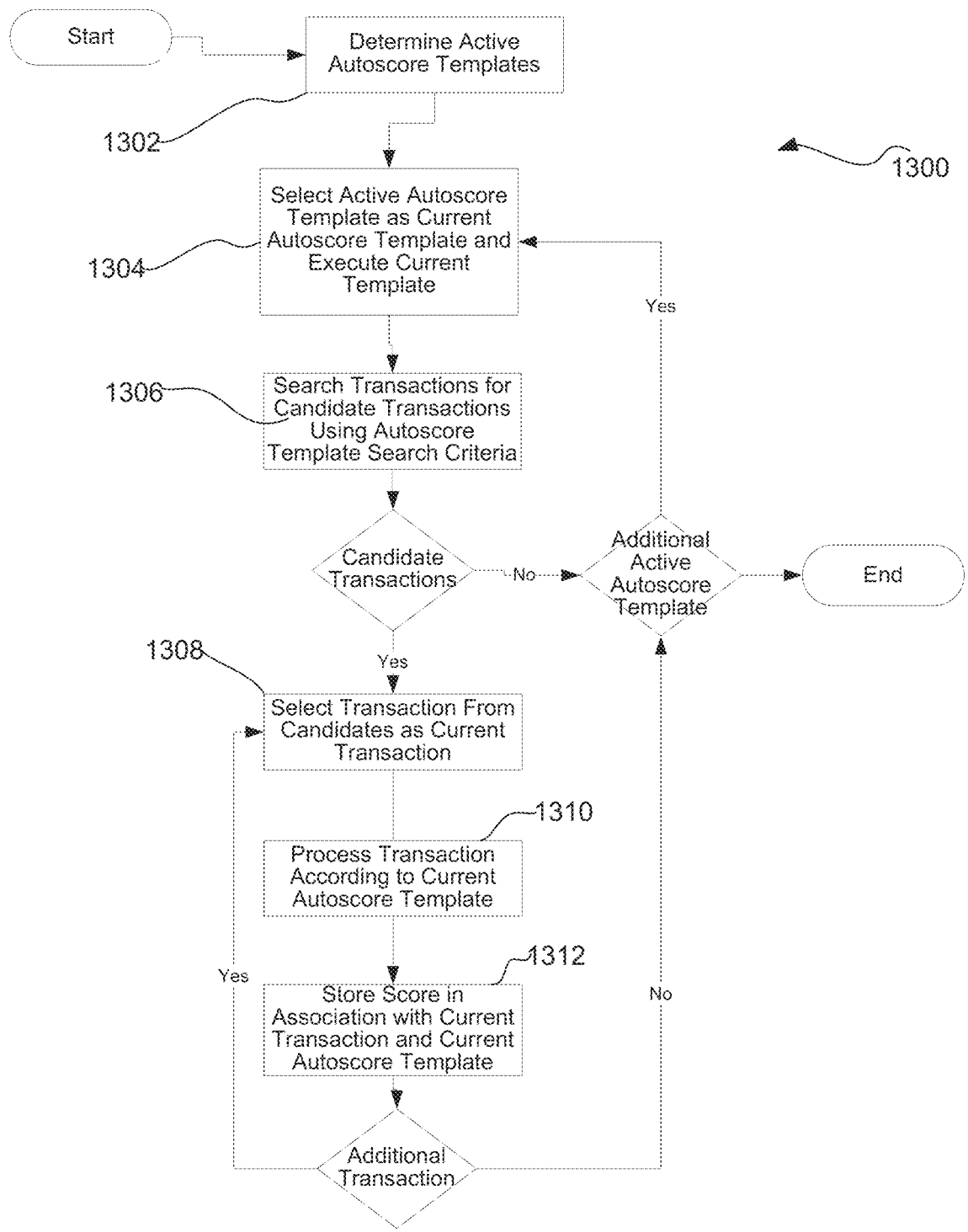
FIG. 14 is a flow chart illustrating one embodiment of a method for autoscoring transactions.

FIG. 14 is a flow chart illustrating one embodiment of a method 1300 for autoscoring transactions. The steps of FIG. 14 may be implemented by a processor of an evaluation system (e.g., evaluation system 200) that executes instructions stored on a computer readable medium. The processor may be coupled to a data store, such as data store 118, data store 208 or data store 206. In one embodiment, the processor may implement an auto scorer, such as auto scorer 232, to implement method 1300.

The system identifies active autoscore templates from a set of autoscore templates (e.g., autoscore templates 246) (step 1302). For example, the evaluation system may query a data store for templates having an execution start data that is less than or equal to the current date and an execution end date that is greater than equal to the current date. The evaluation system can select an active template as the "current autoscore template", load the current autoscore template, including any lexicons included in the autoscore template, and execute the current autoscore template (step 1304). For the current autoscore template, evaluation system formulates search queries based on the search criteria in the current autoscore template and searches a data store (e.g., data store 208) for candidate transactions that meet the search criteria of the active autoscore template (step 1306). The evaluation system may include, as an implicit search criteria for the autoscore template, that the candidate transactions are transactions that have not previously been autoscored based on the current autoscore template. The evaluation system can search the transactions to determine candidate transaction based on transaction metadata that meets the search criteria. In addition or in the alternative, the evaluation system searches the transcripts of the transactions to determine candidate transactions that meet the search criteria of the current autoscore template. If there are no candidate transactions that meet the search criteria of the current autoscore template, the evaluation system can move to the next active autoscore template. If there are transactions that meet the search criteria for the current autoscore template, processing can proceed to step 1308 and the evaluation system selects a candidate transaction as the current transaction.

The evaluation system applies the current autoscore template to the current transaction to determine an autoscore associated with the transaction for the autoscore template (step 1310) and stores the autoscore for the autoscore template in association with the current transaction (step 1312). For example, the identity of the autoscore template and the score generated according to the autoscore template for the transaction may be stored as part of the transaction's metadata in a data store 118, 208. In another embodiment, the autoscore generated for the transaction is stored elsewhere in a manner such that the score is linked to both the transaction and the autoscore template that was used to generate the transaction. One embodiment of scoring a transaction according to an autoscore template is described in conjunction with FIG. 15.

The current autoscore template can be applied to each candidate transaction. Furthermore, each active autoscore template may be executed. The steps of FIG. 14 are provided by way of example and may be performed in other orders. Moreover, steps may be repeated or omitted or additional steps added.

Figure 15:
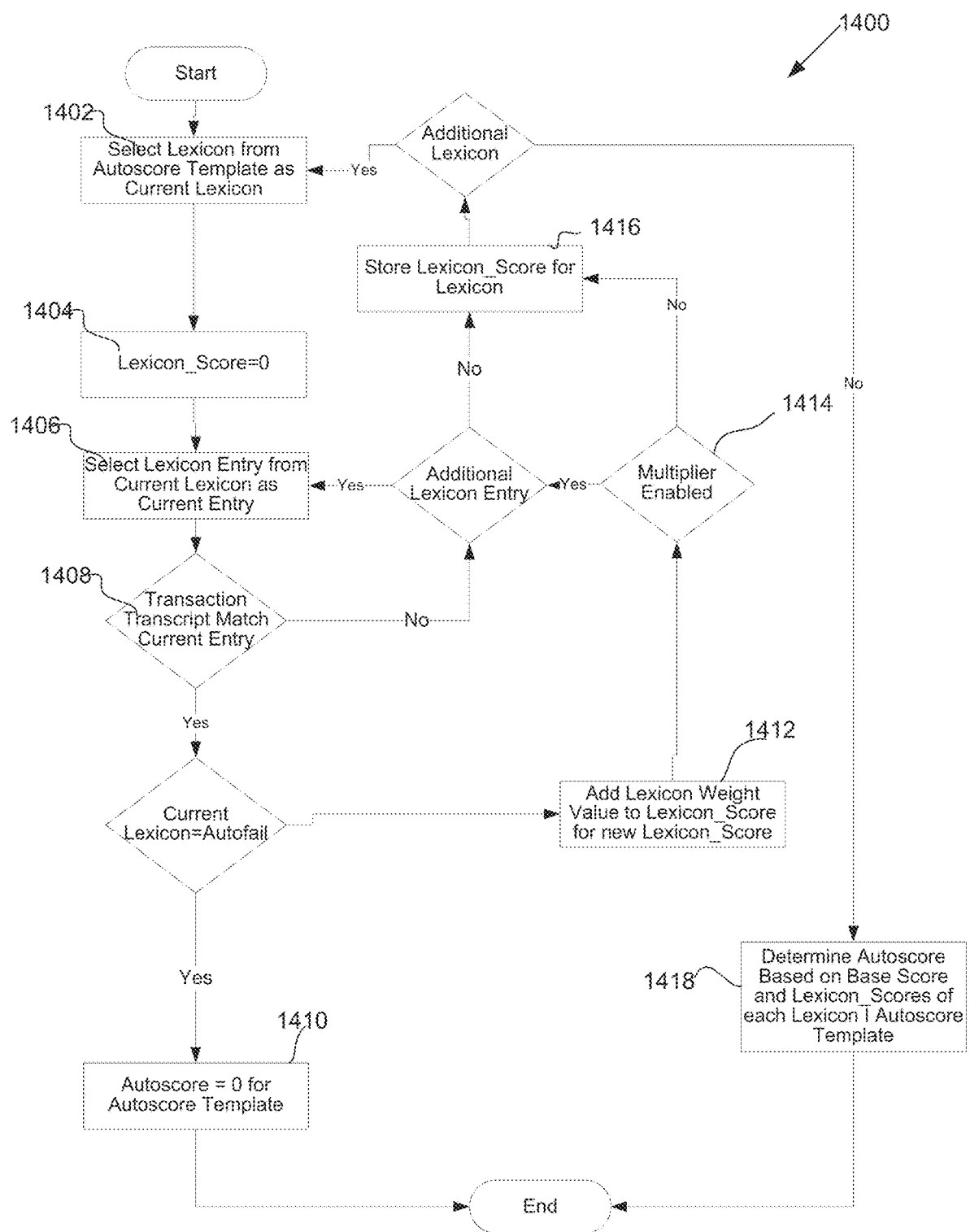
FIG. 15 is a flow chart illustrating one embodiment of a method for autoscoring a current transaction using a current autoscore template.

FIG. 15 is a flow chart illustrating one embodiment of a method 1400 for autoscoring a current transaction using a current autoscore template. According to method 1400, the evaluation system selects a lexicon from the current autoscore template as the current lexicon (step 1402) and sets a score for the current lexicon to 0 (step 1404). The evaluation system selects a lexicon entry from the current lexicon as a current entry (step 1406) and determines if the transaction transcript for the channel specified for the current lexicon in the autoscore template (e.g., via control 419) matches the current lexicon entry. For example, the evaluation system searches the transcript for words/phrases that match the words/phrases or statements specified in the current lexicon entry. If the transcript does not match the lexicon entry, the evaluation system can move to the next lexicon entry.

If a transaction transcript matches the lexicon entry and the current lexicon is designated as an auto fail lexicon for the autoscore template, the evaluation system can output an autoscore of 0 for the transaction for the current autoscore template (step 1410) and move to the next candidate transaction. If the lexicon is not designated as an auto fail lexicon for the autoscore template, the evaluation system can add the lexicon weight value (e.g., as specified via control 422) to the current lexicon score to update the current lexicon score (step 1412). The lexicon weight value may be reduced for the entry if the entry has an entry weight 310 that is less than 1.

If the multiplier is not enabled (e.g., as specified via control 424) (step 1414), the evaluation system stores the lexicon score for the current lexicon, which will equal the lexicon weight value for the current lexicon at this point (step 1416), and moves to the next lexicon in the current autoscore template.

If the multiplier is enabled, the evaluation system can move to the next entry in the lexicon; that is, return to step 1406 and select the next lexicon entry from the current lexicon as the current lexicon entry. Thus, the lexicon score for the current lexicon can increase for each lexicon entry that the transaction transcript matches. When all the lexicon entries in the lexicon have been processed, the evaluation system can store the lexicon score for the current lexicon (step 1416). The evaluation system can apply each lexicon incorporated in the autoscore template and determine a lexicon score for each lexicon.

At step 1418, the evaluation system determines an autoscore for the current transaction and current autoscore template based on the lexicon scores for the lexicons in the current autoscore template, a base score specified in the autoscore template (e.g., as specified via control 410) and a target score algorithm selected for the autoscore template. For example, the evaluation system can add the highest lexicon score of the lexicons associated with the autoscore template to the base score, add the lowest lexicon score of the lexicons associated with the autoscore template to the base score, or add the lexicon scores for all the lexicons associated with the autoscore template to the base score. According to one embodiment, the evaluation system may limit the minimum and maximum for the autoscore for the current transaction to a range, such as e.g., 0-100.

In flow 1400 with the multiplier enabled, a transaction may be scored once for each lexicon entry in a lexicon that the appropriate transcript of the transaction matches. In another embodiment, the transaction may be scored for every hit over every lexicon entry in the transaction transcript to which the lexicon applies. Using the examples of FIG. 3 and FIG. 4, if the agent said "thank you for calling" a number of times, the lexicon score for the "Company Standard Greeting" lexicon can be increased by ten for each instance of "thank you for calling."

The steps of FIG. 15 are provided by way of example and may be performed in other orders. The steps may be repeated or omitted or additional steps added.

Figure 16:
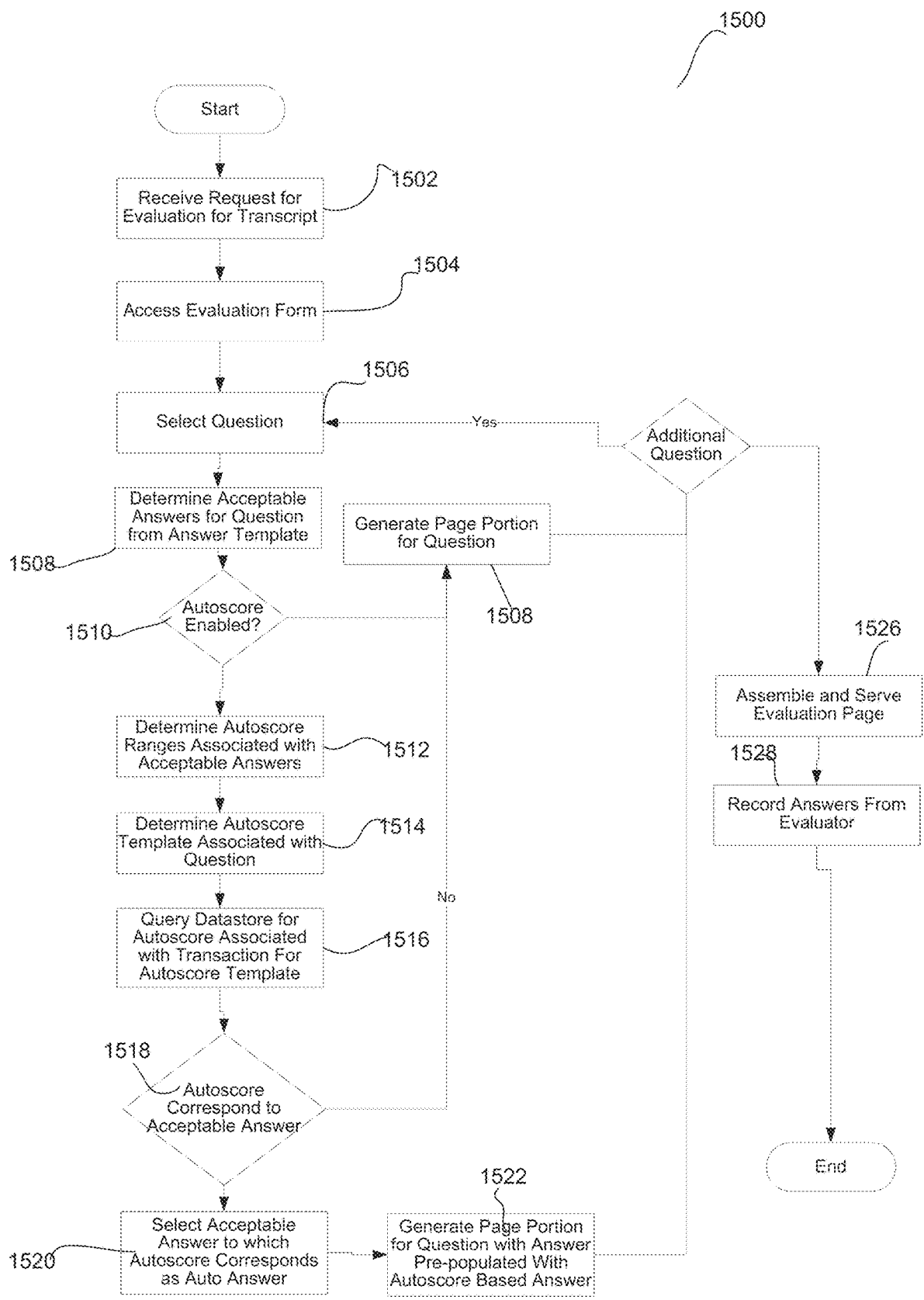
FIG. 16 is a flow chart illustrating one embodiment of a method for generating an evaluation to evaluate a transaction.

FIG. 16 is a flow chart illustrating one embodiment of a method 1500 for generating an evaluation to evaluate a transaction. The steps of FIG. 16 may be implemented by a processor of an evaluation system (e.g., evaluation system 200) that executes instructions stored on a computer readable medium. The processor may be coupled to a data store, such as data store 118, data store 208 or data store 206. The processor may implement an evaluation manager, such as evaluation manager 240 to implement method 1500.

According to one embodiment, evaluation system receives a request from an evaluator for an evaluation to evaluate a transaction. As discussed above, the transaction may be assigned an automated score according to an automated scoring template based on a transcript of the transaction having matched a lexicon associate with the automated scoring template (step 1502). Responsive to the request, the evaluation system creates the requested evaluation from an evaluation form.

The evaluation system accesses the appropriate evaluation form (step 1504) and selects a question from the evaluation form (step 1506). The evaluation system further determines the acceptable answers to the question (step 1508). For example, the evaluation system may access an answer template included in the selected question to determine the acceptable answers for the selected question.

The evaluation system if autoscore is enabled for the question (step 1510) (e.g., as was specified for the question using control 756). If autoscore is not enabled, the evaluation system may generate the page code for the question where the page code includes the question text, scoring tip and answer controls (e.g., drop down list, edit box or multi-select controls) (step 1511). In some cases, an answer may be prepopulated using predefined values that are not based on the autoscores.

If autoscore is enabled for the question, the evaluation system determines the autoscore ranges associated with the acceptable answers. For example, the evaluation system may access an answer template referenced by the question, where the answer template holds the associations between autoscore ranges and acceptable answers for the question (step 1512). Further, the evaluation system determines the autoscore template associated with the question (for example, the autoscore template specified via control 750) (step 1514).

Based on the transaction identification of the transaction to be evaluated and the autoscore template associated with the question, the evaluation system determines the autoscore assigned to the transaction based on the autoscore template associated with the question (step 1516). For example, an autoscore assigned to a transaction and identity of autoscore template that generated the autoscore may be stored in the transaction metadata for the transaction. Thus, the evaluation system can determine the autoscore assigned to the transaction based on the autoscore template associated with the question from the metadata of the transaction to be evaluated. In another embodiment, a data store that holds autoscore records that specify autoscores assigned to transactions and the identities of the autoscore templates that generated the autoscores. The evaluation system can determine the autoscore assigned to the transaction based on the autoscore template by searching the autoscore records.

The evaluation system determines if the autoscore assigned to the transaction based on the autoscore template associated with the question is associated with an acceptable answer to the question. For example, the evaluation system compares the autoscore with the autoscore ranges corresponding to the acceptable answers for the question (step 1518). If the autoscore is not in an autoscore range for an acceptable answer to the question, the evaluation system may generate the page code for the question where the page code includes the question text and answer controls (e.g., drop down list, edit box or multi-select controls) to allow the evaluator to submit an answer (step 1519). In some cases, an answer may be prepopulated using predefined values that are not based on the autoscores (e.g., based on inputs via controls 772, 774).

If the autoscore assigned to the transaction based on the autoscore template associated with the question is associated with an acceptable answer to the question, the evaluation system selects the acceptable answer to which the autoscore corresponds. For example, if the autoscore is in an autoscore range corresponding to an acceptable answer for the question, the evaluation system selects that acceptable answer as the autoscore auto answer for the question (step 1520). The evaluation system generates the page code for the question where the page code includes the question text and answer controls (e.g., drop down list, edit box or multi-select controls) to allow the evaluator to submit an answer (step 1522). In this case, the evaluation system presets the answer controls in the page code for the question to the preselected autoscore auto answer (the answer selected in step 1520) (e.g., sets a radio button to "checked", sets a selected list option value for a dropdown list as selected or otherwise sets the answer control to indicate the preselected answer).

Using the example of FIG. 10 and FIG. 13, if the transaction was assigned an autoscore of 91 based on the autoscore template referenced in the question, the evaluation system can generate page code having a "Yes" radio button and a "No" radio button with the "Yes" radio button marked as checked in the page code. Thus, the "Yes" radio button is preselected when the evaluator receives evaluation 1275. As another example that uses the autoscore ranges of FIG. 11, if the transaction was assigned an autoscore of 75 based on the autoscore template referenced in the question, the evaluation system may generate page code with a drop list having the options "Excellent," "Exceeds Expectations," "Meets Expectations" "Needs Improvement" and "Poor," with "Exceeds Expectations" option marked as selected in the page code. Thus, the initial state of a menu, radio button or other answer control in an evaluation may be set to reflect the preselected answer that was selected based on a defined correspondence between the assigned autoscore and the preselected answer.

The evaluation system assembles the evaluation page and serves the evaluation to the evaluator (e.g., for display in operator interface 212) (step 1526). The answers entered by the evaluator can be received by the evaluation system and recorded as a completed evaluation (e.g., in data store 118, 208) (step 1528). The completed evaluation can include for each question, the autoscore auto answer determined by the evaluation system (that is the answer to the question preselected based on the autoscore), if any, and the evaluator submitted answer.

The steps of FIG. 16 are provided by way of example and may be performed in other orders. Moreover, steps may be repeated or omitted or additional steps added.

The evaluation system can further determine when an evaluator changed the answer to a question from the prepopulated autoscore auto answer determined based on the autoscore. The evaluator submitted answers to a question provided by evaluators over a number of transactions can be compared to the autoscore auto answers provided to the evaluators for the question to determine a confidence score for the autoscore template that was used to autoscore the transactions for the questions. If the evaluators change the answers to the question frequently from the autoscore auto answers, this could indicate and issue with the accuracy of the autoscore template. The evaluation system can be configured to generate an alert or take other actions when the confidence level of an autoscore template drops below a threshold.

Returning briefly to FIG. 2, analytics component 242 can analyze the results of evaluations to determine if the evaluation system requires retuning. In one embodiment, server engine 220 and analytics component 242 cooperate to provide reports to reviewers in an operator interface (e.g., operator interface 210).

Figure 17:
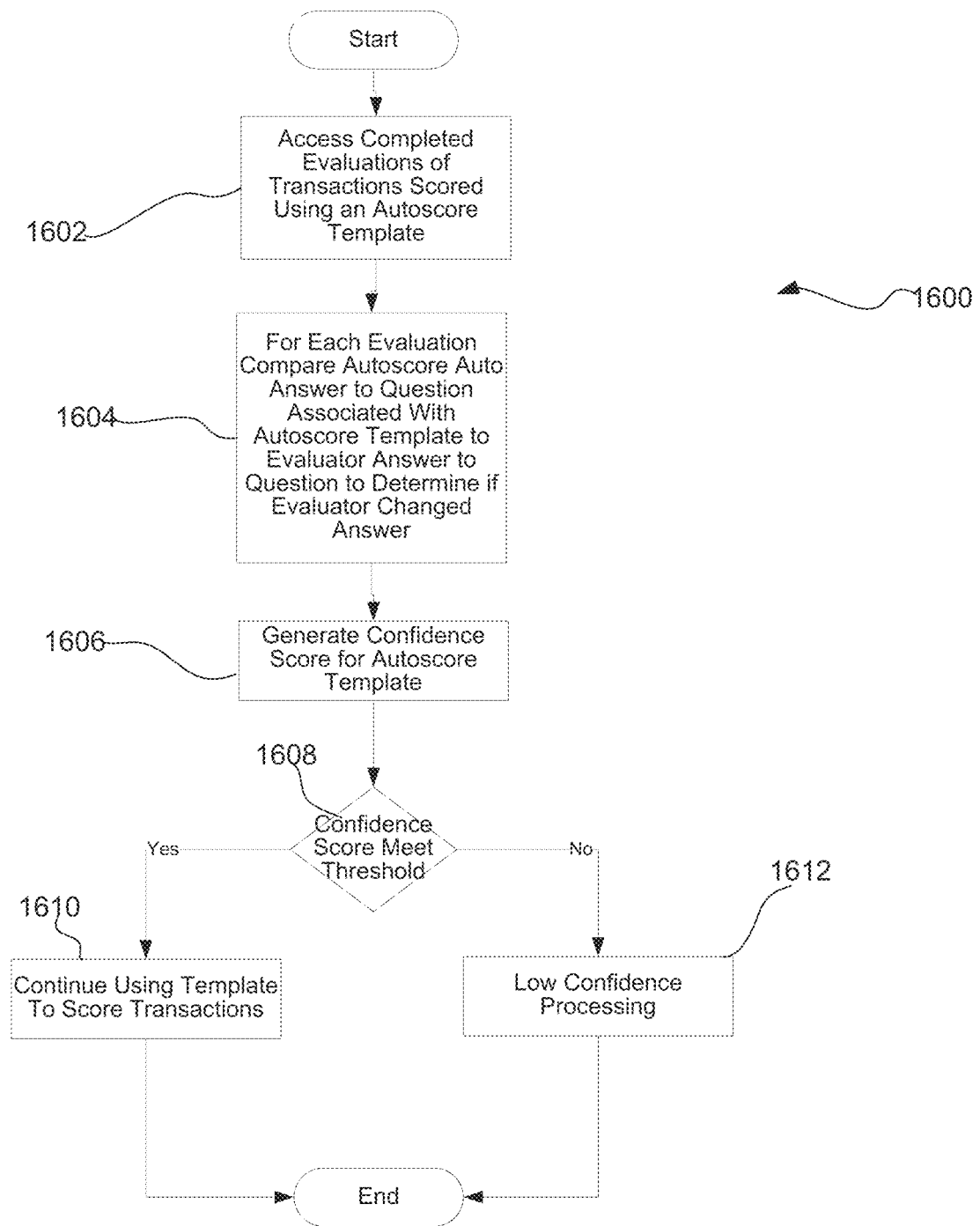
FIG. 17 is a flow chart illustrating one embodiment of a method for analyzing the results of evaluations.

With reference to FIG. 17, FIG. 17 is a flow chart illustrating one embodiment of a method 1600 for analyzing the results of evaluations. The steps of FIG. 17 may be implemented by a processor of an evaluation system (e.g., evaluation system 200) that executes instructions stored on a computer readable medium. The processor may be coupled to a data store, such as data store 118, data store 208 or data store 206. The processor may implement an analytics component, such as analytics component 242, to implement method 1600.

At step 1602, the evaluation system selects an autoscore template for analysis and identifies and accesses the completed evaluations of transactions scored using that autoscore template. For each of the evaluations identified in step 1602, the evaluation system compares the autoscore auto answer to a question associated with the autoscore template—that is, the preselected answer to the question preselected based on the autoscore assigned according to the autoscore template—to the evaluator submitted answer to the question to determine if the evaluator changed the answer from the preselected answer (step 1604).

Based on the comparisons of step 1604, the evaluation system can determine a confidence score for the selected autoscore template (step 1606). According to one embodiment, for example, if the evaluation system determines that evaluators changed the answer to the question from the preselected answer in twenty five percent of the evaluations, the evaluation system can assign a confidence score of 75 to the selected autoscore template.

At step 1608, the evaluation system compares the confidence score for the autoscore template to a threshold. If the confidence score for the autoscore template meets the threshold, the evaluation system can use the autoscore template to score non-evaluated transactions (step 1610). If the confidence score for the autoscore template does not meet the confidence threshold, the evaluation system may implement low confidence processing for the autoscore template (step 1612).

Low confidence processing may involve a wide variety of processing. According to one embodiment for example, the evaluation flags the autoscore template so that auto scorer 232 stops using the autoscore template. As another example, the evaluation system generates an alert to a user so that the user can retune the autoscore template. Other processing may also be implemented.

The steps of FIG. 17 are provided by way of example and may be performed in other orders. Moreover, steps may be repeated or omitted or additional steps added.

Returning to FIG. 2, analytics component 242 may produce reports based on analyzing evaluations of transactions scored by an autoscore template. FIG. 18 illustrates one embodiment of a confidence score report 1650 on an autoscore template. The report shows that, for example, the autoscore answer is frequently changed.

If the confidence score on the report is below a defined threshold, the evaluation system can implement low confidence processing as discussed above. A user may be given the option to add words or phrases in the lexicon, add or remove lexicons, adjust the template base score, change the multiplier or change the search criteria on the template, change the autoscore ranges or take other actions based on the answers. On the other hand, if the confidence is high, the autoscore template can be used to auto-score non-evaluated recordings.

Figure 19:
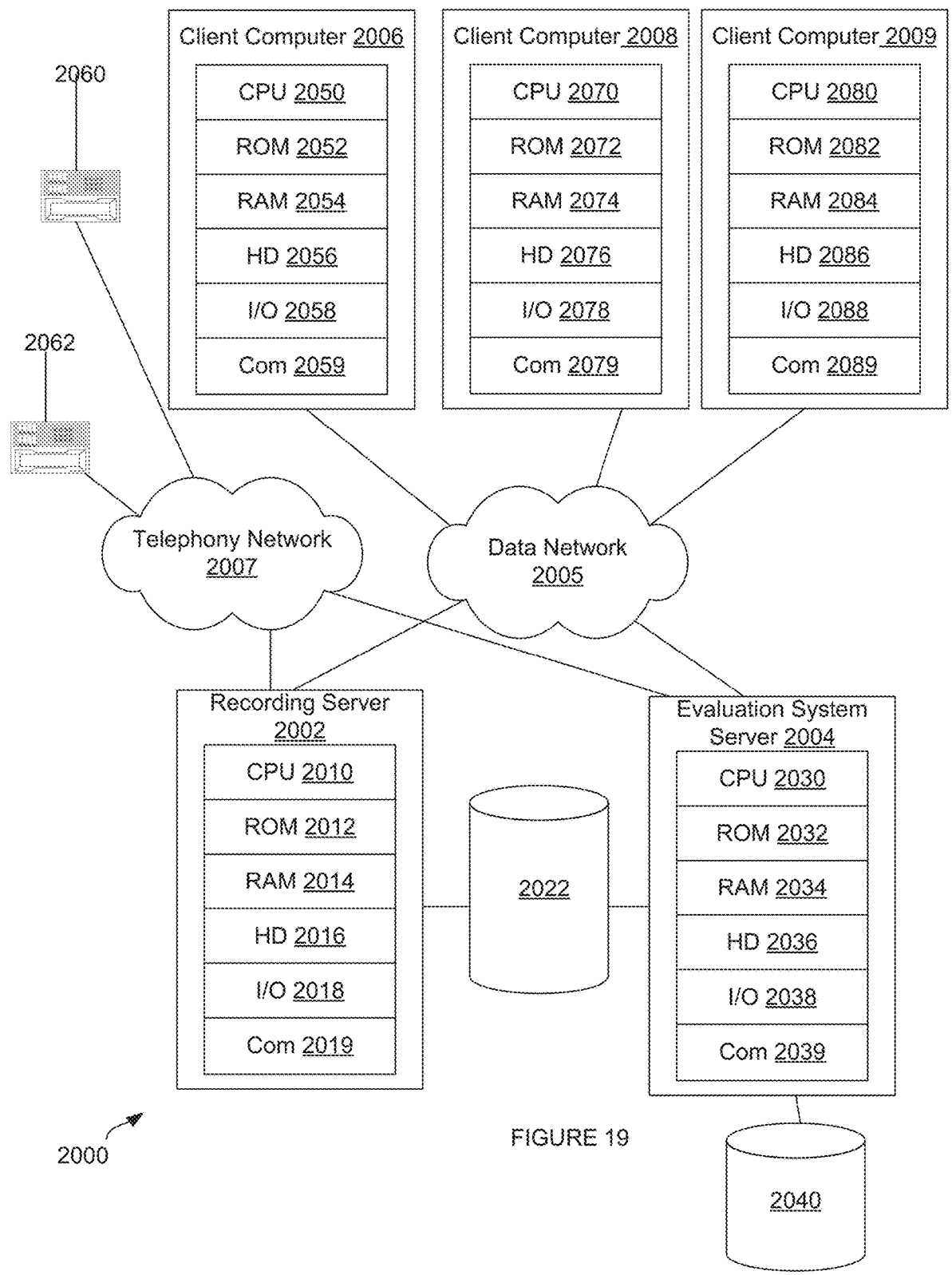
FIG. 19 is a diagrammatic representation of a distributed network computing environment.

FIG. 19 is a diagrammatic representation of a distributed network computing environment 2000 where embodiments disclosed herein can be implemented. In the example illustrated, network computing environment 2000 includes a data network 2005 that can be bi-directionally coupled to client computers 2006, 2008, 2009 and server computers 2002 and 2004. Network 2005 may represent a combination of wired and wireless networks that network computing environment 2000 may utilize for various types of network communications known to those skilled in the art. Data network 2005 may be, for example, a WAN, LAN, the Internet or a combination thereof.

Further, network computing environment includes a telephony network 2007 to connect server computer 2002 and server computer 2004 to call center voice instruments 2060 and external voice instruments 2062. Telephony network 2007 may utilize various types of voice communication known in the art. Telephony network may comprise, for example, a PTSN, PBX, VOIP network, cellular network or combination thereof.

For the purpose of illustration, a single system is shown for each of computer 2002, 2004, 2006, 2008 and 2009 and a single voice instrument is shown for each of voice instruments 2060, 2062. However, each computer 2002, 2004, 2006, 2008 and 2009 may comprise a plurality of computers (not shown) interconnected to each other over network 2005. For example, a plurality of computers 2002, a plurality of computers 2004, a plurality of computers 2006, a plurality of computers 2008 and a plurality of computer 2009 may be coupled to network 2005. Furthermore, a plurality of computers 2002, plurality of computers 2004, a plurality of voice instruments 2062 and a plurality of voice instruments 2060 may be coupled to telephony network 2007.

Server computer 2002 can include can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005 and phone interface cards to interface with telephony network 2007.

According to one embodiment, server computer 2002 may include computer executable instructions stored on a non-transitory computer readable medium coupled to a processor. The computer executable instructions of server 2002 may be executable to provide a recording system. For example, the computer executable instructions may be executable to provide a recording server, such as recording server 114, or an ingestion server, such as ingestion server 116. Server computer 2002 may implement a recording system that records voice sessions between a voice instrument 2060 and a voice instrument 2062 (e.g., between a call center agent voice instrument and a customer voice instrument) and data sessions with client computer 2006. Server computer 2002 stores session data for voice and data sessions in transaction data store 2022.

Server computer 2004 can comprise CPU 2030, ROM 2032, RAM 2034, HD 2036, I/O 2038 and communications interface 2039. I/O 2038 can include a keyboard, monitor, printer, electronic pointing device (e.g., mouse, trackball, stylus, etc.), or the like. Communications interface 2039 may include a communications interface, such as a network interface card, to interface with network 2005 and telephony interface card to interface with telephony network 2007.

According to one embodiment, server computer 2004 may include a processor (e.g., CPU 2030) coupled to a data store configured to store transactions (e.g., transaction metadata and associated recorded sessions). For example, server computer 2004 may include CPU 2030 coupled to data store 2022 via network 2005. Server computer 2004 may further comprise computer executable instructions stored on a non-transitory computer readable medium coupled to the processor. The computer executable instructions of server 2004 may be executable to provide an evaluation system The computer executable instructions may be executable to provide a variety of services to client computer 2006, 2008, such as providing interfaces to allow a designer to design lexicons, autoscore templates, questions, answer templates and evaluation forms. The computer executable instructions of server computer 2004 may be further executable to execute to evaluations to evaluators. The computer executable instructions may further utilize data stored in a data store 2040. According to one embodiment, the computer executable instructions may be executable to implement server tier 202.

Computer 2006 can comprise CPU 2050, ROM 2052, RAM 2054, HD 2056, I/O 2058 and communications interface 2059. I/O 2058 can include a keyboard, monitor, printer, electronic pointing device (e.g., mouse, trackball, stylus, etc.), or the like. Communications interface 2059 may include a communications interface, such as a network interface card, to interface with network 2005. Computer 2006 may comprise call center agent software to allow a call center agent to participate in a data session that is recorded by server 2002. Computer 2006 may be an example of an agent computer 164 or a supervisor computer 174.

Computer 2008 can similarly comprise CPU 2070, ROM 2072, RAM 2074, HD 2076, I/O 2078 and communications interface 2079. I/O 2078 can include a keyboard, monitor, printer, electronic pointing device (e.g., mouse, trackball, stylus, etc.), or the like. Communications interface 2079 may include a communications interface, such as a network interface card, to interface with network 2005. Computer 2008 may comprise a web browser or other application that can cooperate with server computer 2004 to allow a user to define lexicons, autoscore templates, questions, answer templates and evaluation forms. Computer 2008 may be an example of a client computer 180. According to one embodiment, computer 2006 or computer 2008 may implement client tier 203.

Computer 2009 can similarly comprise CPU 2080, ROM 2082, RAM 2084, HD 2086, I/O 2088 and communications interface 2089. I/O 2088 can include a keyboard, monitor, printer, electronic pointing device (e.g., mouse, trackball, stylus, etc.), or the like. Communications interface 2089 may include a communications interface, such as a network interface card, to interface with network 2005. Computer 2009 may comprise a web browser that allows an evaluator to complete evaluations. Computer 2009 may be another example of a client computer 180.

Call center voice instrument 2060 and external voice instrument 2062 may operate according to any suitable telephony protocol. Call center voice instrument 2060 can be an example of agent voice instrument 162 or supervisor voice instrument 172 and external voice instrument 2062 may be an example of a customer voice instrument.

Each of the computers in FIG. 19 may have more than one CPU, ROM, RAM, HD, I/O, or other hardware components. For the sake of brevity, each computer is illustrated as having one of each of the hardware components, even if more than one is used. Each of computers 2002, 2004, 2006, 2008, 2009 is an example of a data processing system. ROM 2012, 2032, 2052, 2072 and 2082; RAM 2014, 2034, 2054, 2074 and 2084; HD 2016, 2036, 2056, 2076 and 2086; and data store 2022, 2040 can include media that can be read by 2010, 2030, 2050, 2070 and 2080. These memories may be internal or external to computers 2002, 2004, 2006, 2008 or 2009.

Portions of the methods described herein may be implemented in suitable software code that may reside within ROM 2012, 2032, 2052, 2072 and 2082; RAM 2014, 2034, 2054, 2074 and 2084; HD 2016, 2036, 2056, 2076 and 2086. In addition to those types of memories, the instructions in an embodiment disclosed herein may be contained on a data storage device with a different computer-readable storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A data processing system for populating selections in an evaluation operator interface, comprising:
   a processor;
   a data store storing a plurality of transactions, an automated scoring template having an associated lexicon and scoring parameters, a question associated with the automated scoring template and an evaluation form associated with the question, an automated score for each of the plurality of transactions according to the automated scoring template based on a transcript of each respective transaction having matched the lexicon associated with the automated scoring template, and wherein each of the plurality of transactions comprises a voice session recording of an inbound call recorded by a call center recording system and a transcript of the voice session;
   a non-transitory computer readable medium having instructions executable on the processor for:
      receiving a request from a client computer for an evaluation to evaluate a first transaction;
      querying the data store for the automated score associated with the first transaction;
      in response to the request for the evaluation, generating the evaluation from the evaluation form, wherein generating the evaluation comprises setting an answer control in the evaluation to a preselected answer to the question based on the automated score for the first transaction and a defined correspondence between the automated score and an acceptable answer to the question, the preselected answer selected from a defined set of acceptable answers to the question;
      serving the evaluation with the preselected answer to the client computer for display in an evaluation operator interface;
      accessing a plurality of completed evaluations for a set of transactions scored using the automated scoring template;
      comparing evaluator answers to the question to preselected answers to the question in the plurality of completed evaluations;
      determining a confidence score for the automated scoring template based on the comparison;
      based on a determination that the confidence score for the automated scoring template meets a threshold, continuing to use the automated scoring template to score transactions from the plurality of transactions; and
      based on a determination that the confidence score for the automated scoring template does not meet the threshold, stopping use of the automated scoring template.

2. The data processing system of claim 1, wherein:
   the scoring parameters comprise a base score and lexicon scoring parameters associated with the lexicon;
   the non-transitory computer readable medium further comprises instructions executable on the processor for executing the automated scoring template to assign the automated score to the first transaction; and
   executing the automated scoring template to assign the automated score to the first transaction further comprises:
      loading, by the processor, the transcript from the first transaction;
      searching the transcript of the first transaction for a word or phrase from the lexicon;
      based on a determination that the first transaction includes the word or phrase from the lexicon, assigning the lexicon a score based on the lexicon scoring parameters; and
      adding the lexicon score to the base score.

3. The data processing system of claim 1, wherein the automated scoring template comprises search criteria and the non-transitory computer readable medium further comprises instructions executable on the processor for:
   searching the plurality of transactions for candidate transactions using the search criteria to identify transactions to score according to the automated scoring template.

4. The data processing system of claim 1, wherein the non-transitory computer readable medium further comprises instructions executable on the processor for executing the automated scoring template in a background process.

5. The data processing system of claim 1, wherein the defined correspondence between the automated score and the preselected answer to the question comprises a defined correspondence between an automated score range and an acceptable answer from the set of acceptable answers.

6. The data processing system of claim 5, wherein the data store further stores an answer template defining the set of acceptable answers and the correspondence between the automated score range and the acceptable answer.

7. The data processing system of claim 1, wherein the non-transitory computer readable medium further comprises instructions executable on the processor for:
   receiving an evaluator answer to the question from the client computer; and storing a completed evaluation comprising the evaluator answer and the preselected answer.

8. The data processing system of claim 1, wherein generating the evaluation further comprises generating page code for the question, the page code comprising question text and page code for the answer control that sets the answer control to the preselected answer.

9. A computer program product comprising a non-transitory computer readable medium storing a set of computer instructions executable by a processor to:
  access a data store comprising a plurality of transactions, an automated scoring template associated with the lexicon and scoring parameters, a question associated with the automated scoring template, and an evaluation form associated with the question, an automated score for each of the plurality of transactions according to the automated scoring template based on a transcript of each respective transaction having matched the lexicon associated with the automated scoring template, and wherein each of the plurality of transactions comprises a voice session recording of an inbound call recorded by a call center recording system and a transcript of the voice session;
  receive a request from a client computer for an evaluation to evaluate a first transaction;
  query the data store for the automated score associated with the first transaction;
  in response to the request for the evaluation, generating the evaluation from the evaluation form, wherein generating the evaluation comprises setting an answer control in the evaluation to a preselected answer to the question based on a defined correspondence between the automated score and the preselected answer to the question, the preselected answer to the question selected from a set of acceptable answers to the question;
  serve the evaluation with the preselected answer to the question to the client computer for display in an evaluation operator interface;
  access a plurality of completed evaluations for a set of transactions scored using the automated scoring template;
  compare evaluator answers to the question to preselected answers to the question in the plurality of completed evaluations; and
  determine a confidence score for the automated scoring templated based on the comparison;
  based on a determination that the confidence score for the automated scoring template meets a threshold, continuing to use the automated scoring template to score transactions from the plurality of transactions; and
  based on a determination that the confidence score for the automated scoring template does not meet the threshold, stopping use of the automated scoring template.

10. The computer program product of claim 9, further comprising instructions executable to execute the automated scoring template to assign the automated score to the first transaction, wherein executing the automated scoring template comprises:
  loading, by the processor, a transcript from the first transaction;
  searching the transcript of the first transaction for a word or phrase from the lexicon;
  based on a determination that the first transaction includes the word or phrase from the lexicon, assigning the lexicon a lexicon score based on lexicon scoring parameters included in the automated scoring template; and
  adding the lexicon score to a base score included in the automated scoring template.

11. The computer program product of claim 10, further comprising computer instructions executable to search the plurality of transactions for candidate transactions using search criteria from the automated scoring template to identify transactions to score according to the automated scoring template.

12. The computer program product of claim 11, comprising computer instructions executable to execute the automated scoring template in a background process.

13. The computer program product of claim 9, wherein the defined correspondence between the automated score and the preselected answer to the question comprises a defined correspondence between an automated score range and an acceptable answer from the set of acceptable answers.

14. The computer program product of claim 13, wherein the data store further stores an answer template defining the set of acceptable answers and the correspondence between the automated score range and the acceptable answer.

15. The computer program product of claim 9, further comprising computer instructions executable to:
  receive an evaluator answer to the question from the client computer; and
  store a completed evaluation comprising the evaluator answer and the preselected answer.

16. The computer program product of claim 9, wherein generating the evaluation comprises generating page code for the question, the page code comprising question text and page code for the answer control that sets the answer control to the preselected answer.

* * * * *